(12) United States Patent
Churchman

(10) Patent No.: US 9,586,116 B2
(45) Date of Patent: Mar. 7, 2017

(54) TRAINING SYSTEM AND METHOD

(71) Applicant: David Churchman, Westminster, CO (US)

(72) Inventor: David Churchman, Westminster, CO (US)

( * ) Notice: Subject to any disclaimer, the term of this patent is extended or adjusted under 35 U.S.C. 154(b) by 330 days.

(21) Appl. No.: 14/339,166

(22) Filed: Jul. 23, 2014

(65) Prior Publication Data

US 2015/0051024 A1 Feb. 19, 2015

Related U.S. Application Data

(60) Provisional application No. 61/867,210, filed on Aug. 19, 2013, provisional application No. 62/003,016, filed on May 26, 2014.

(51) Int. Cl.

| | | |
|---|---|---|
| *A63F 9/24* | (2006.01) | |
| *A63B 69/00* | (2006.01) | |
| *A63B 24/00* | (2006.01) | |
| *A63B 71/06* | (2006.01) | |
| *G09B 19/00* | (2006.01) | |
| *A42B 3/04* | (2006.01) | |

(52) U.S. Cl.
CPC ............ *A63B 69/00* (2013.01); *A42B 3/0433* (2013.01); *A63B 24/0006* (2013.01); *A63B 71/0622* (2013.01); *G09B 19/0038* (2013.01); *A63B 2024/0012* (2013.01); *A63B 2071/0627* (2013.01); *A63B 2220/16* (2013.01); *A63B 2220/40* (2013.01); *A63B 2220/62* (2013.01); *A63B 2225/50* (2013.01); *A63B 2243/007* (2013.01)

(58) Field of Classification Search
None
See application file for complete search history.

(56) References Cited

U.S. PATENT DOCUMENTS

| | | | |
|---|---|---|---|
| 5,524,894 A | 6/1996 | Shannon | |
| 6,059,576 A | 5/2000 | Brann | |
| | (Continued) | | |

*Primary Examiner* — Paul A D'Agostino
(74) *Attorney, Agent, or Firm* — Oppedahl Patent Law Firm LLC

(57) ABSTRACT

Disclosed herein are embodiments of an American-style football quarterback training device and method. Goals associated with the disclosed system include training a quarterback to not telegraph passes and to look in a direction opposite to where the ball is about to be thrown. The disclosed device comprises a sensor that is mountable on desired headgear, for example a football helmet, and is useful for detecting lateral head position and lateral head movement, a processor for processing data associated with the lateral head position and for processing data associated with lateral head movement, a user interface, a memory storage device, and optionally a timer, each of which are in communication with the processor and sensor. The lateral head position a quarterback can be monitored and data can be captured and processed relative to when the quarterback's head moves outside of an acceptable threshold range of acceptable lateral head positions. In some embodiments, users may be notified through one or more alarms if the quarterback's head moves outside of the acceptable threshold range of acceptable lateral head positions.

30 Claims, 22 Drawing Sheets

(56) References Cited

U.S. PATENT DOCUMENTS

| | | | |
|---|---|---|---|
| 7,288,033 B1* | 10/2007 | Jordan | A63B 63/00 473/439 |
| 7,383,728 B2* | 6/2008 | Noble | A61B 5/1116 600/595 |
| 8,036,826 B2 | 10/2011 | MacIntosh | |
| 2011/0165971 A1 | 7/2011 | Forrest | |
| 2012/0081531 A1 | 4/2012 | DeAngelis | |
| 2013/0012339 A1* | 1/2013 | Rockoff | A63B 63/00 473/422 |
| 2013/0040764 A1 | 2/2013 | Daniels | |

* cited by examiner

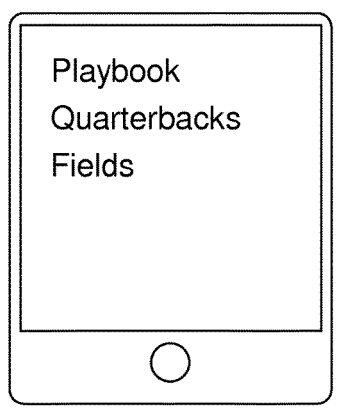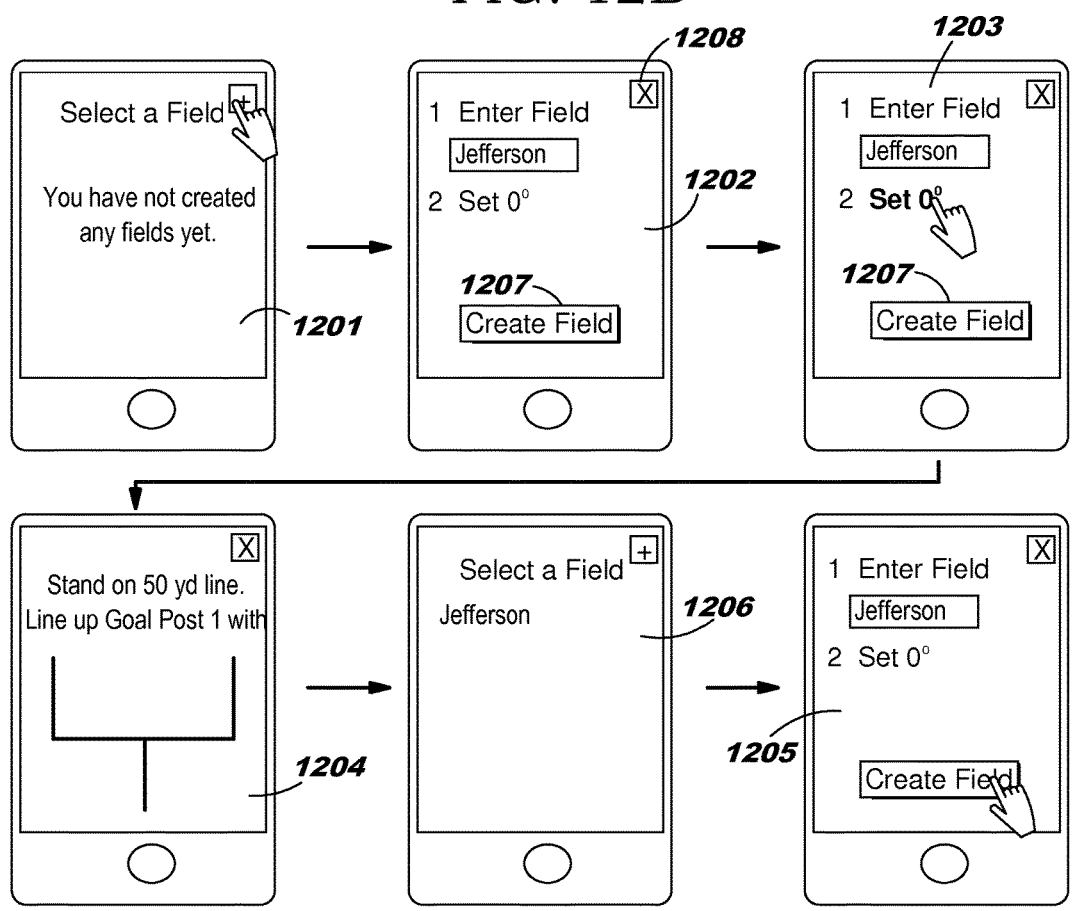

FIG. 17A
FIG. 17B
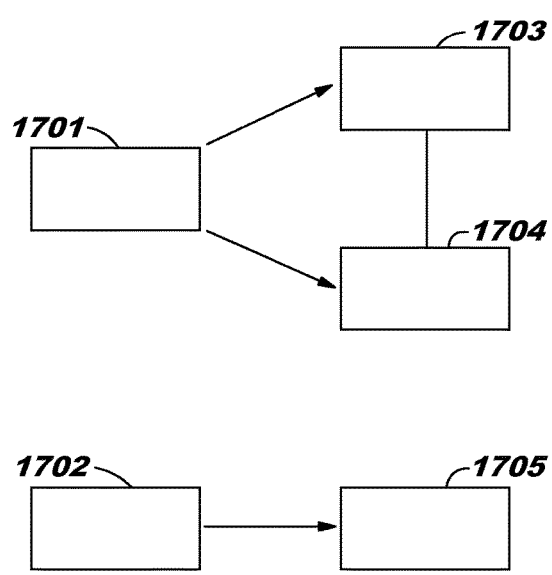
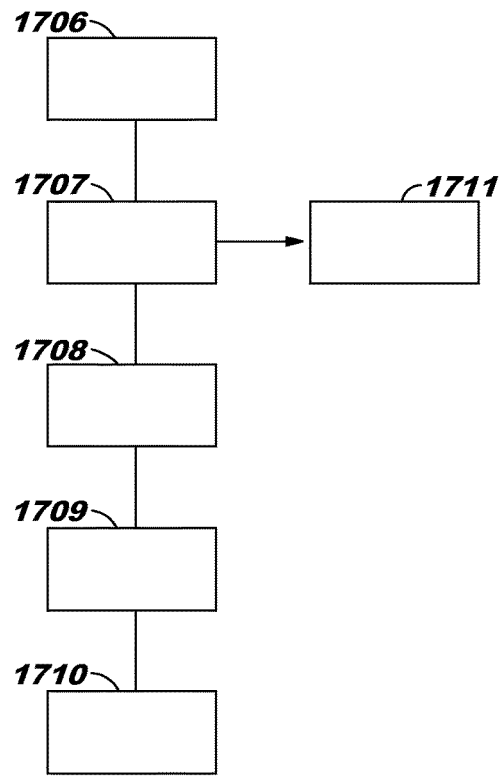

To Receiver Selection (FIG. 19B)

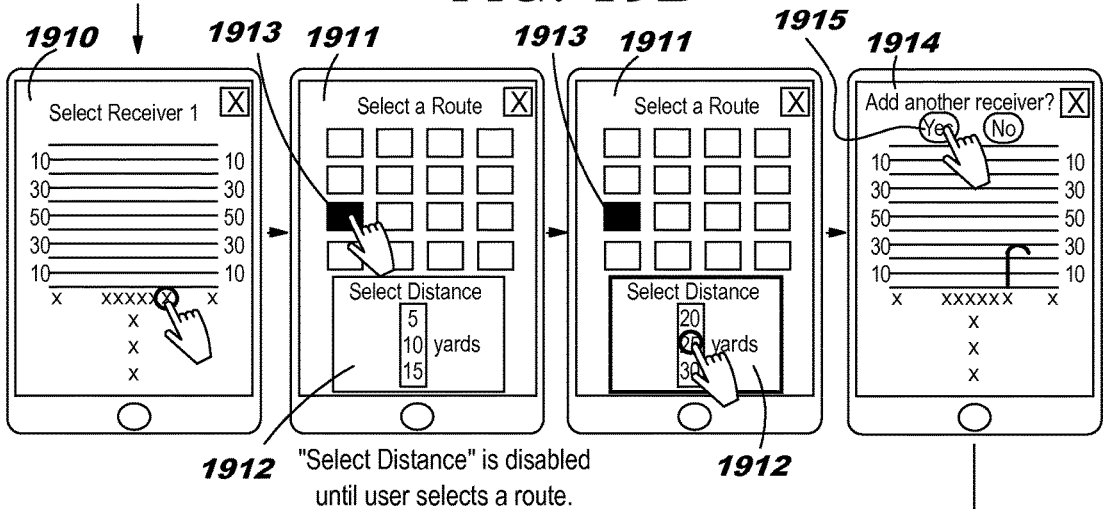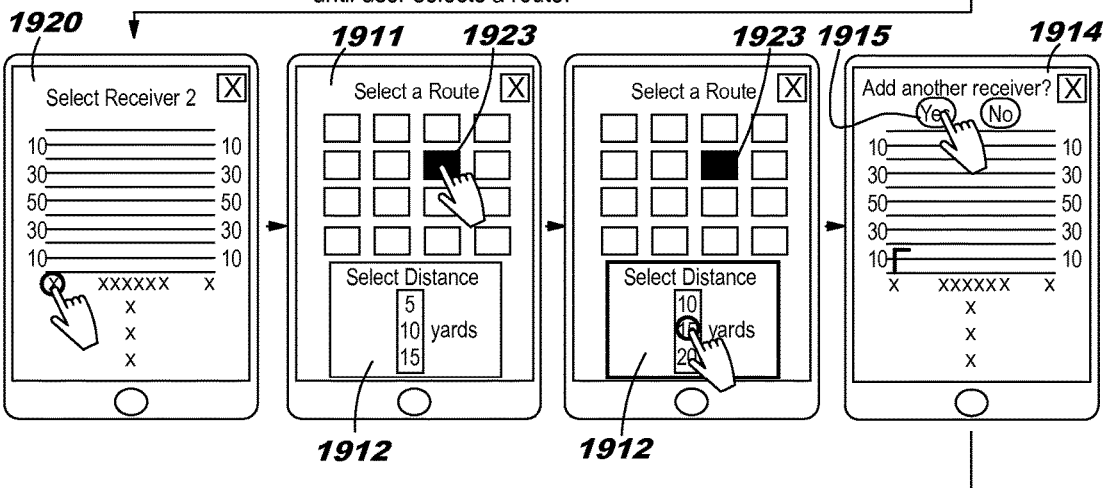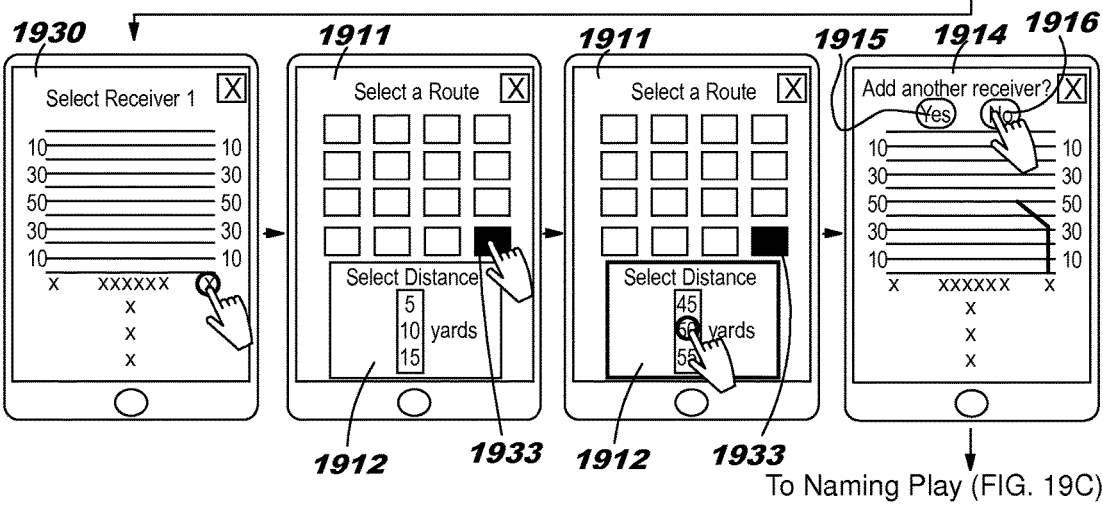
FIG. 19B

FIG. 20
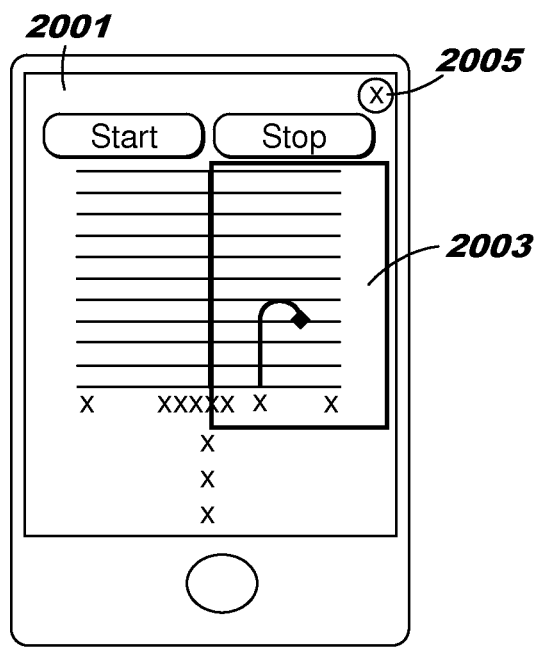
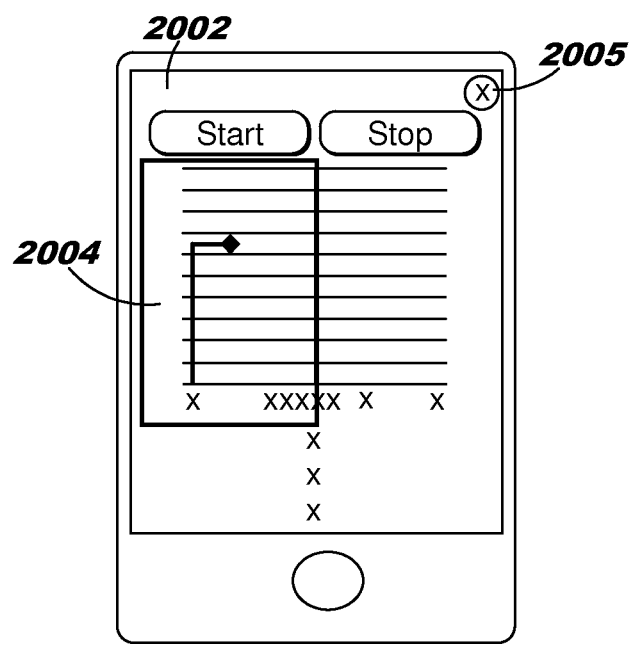

TRAINING SYSTEM AND METHOD

CROSS REFERENCE APPLICATIONS

This application is a non-provisional application claiming the benefits of provisional application No. 61/867,210 filed Aug. 19, 2013 and provisional application No. 62/003,016 filed May 26, 2014, each of the disclosures being hereby incorporated by reference for all purposes.

BACKGROUND

In the game of American Football (or "gridiron", as it is sometimes referred to in other countries), a defense can be very effective if it anticipates the strategy of the offense by studying the body language and body movement "tells" of the quarterback prior to the start of a play. As a result, the defense will shift in a particular direction before a play even begins; leaving all of the intended receivers of the offense well covered by the time the quarterback is ready to throw the ball.

One of these body movement "tells" is the undesirable habit of a quarterback positioning his head/helmet in the direction of the intended receiver immediately after taking possession of the football. This is commonly referred to in football as "telegraphing the pass". Telegraphing, like other readable body movement, creates an advantage for the defenders of a forward pass play because defenders are trained to run towards, and defend more vigorously, areas of the playing field that are directionally aligned with the quarterback's head/helmet. This is often referred to as "reading the quarterback's eyes".

While "eyes" can be covered with shaded visor, head and body motion is not so easily disguisable. It is therefore desirable for a quarterback to find a way to control head motion, body language, and body movement to avoid helping the defense anticipate potential pass plays. Taking this concept a step further, the most skilled quarterbacks are not only are able to avoid tells by controlling their body language and movement, but they may also be able to "trick" the defense by faking a tell, such as looking in a particular direction when the play is intended to move in the opposite direction. A well-known master of this type of skill, although in his case it was applied to the game of basketball, was successful point guard Magic Johnson.

Developing a quarterback's ability to intentionally misdirect the defense with head position and body language is not an easy task. One major challenge is that it is counter-intuitive for the quarterback to look in a particular direction while an intended pass play progresses in an opposite direction. Therefore, it would be desirable to develop a specialized discipline and practice pattern in the form of a training program to assist a quarterback in perfecting this type of skill Ideally the program would require repetitive drills and would incorporate a specialized device for recording progress as well as for giving the quarterback immediate feedback based on the performance of the drills. The goals of the training program in conjunction with the device would include training a quarterback to look right when passing left, to look left when passing right, and to look left or right when passing towards the center of the field, ultimately resulting in the creation of a "Magic Johnson" of football.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The methods disclosed herein are directed toward the sport of American style football with a goal of training a quarterback to not "telegraph" passes. As those involved in the participation of, coaching, training, and even watching the sport of football understand, a throw has a better chance of not being "read" by the defense if the quarterback is not looking exactly where the ball is planned to be thrown. Additionally, the defense is less able to accurately position itself prior to a throw if it does not have an indication of where the ball might be intended to be thrown ahead of time. In order to help elevate this problem, a quarterback who wants to be competitive should, at the very least, learn to not look directly where the ball is to be thrown prior to throwing it. It also would be extremely helpful for an offense if the quarterback were able to look the opposite direction from where the ball was intended to be thrown.

It should be appreciated that in order to avoid giving the defense an advantage, a quarterback does not necessarily need to look away from the planned direction of the throw right up until the moment the ball is released. Doing so might cause additional problems as a receiver may not actually turn out to be where the quarterback anticipated the receiver to be. This could lead to an incomplete pass or an interception. Instead, if a sufficient amount of time (such as about three seconds) has passed from the time the ball was snapped to the quarterback, and the quarterback has been skillfully looking elsewhere from the direction the ball is about to be thrown, then it is likely that the defense has shifted in a direction away from where the ball is to be thrown. If so, the quarterback would have enough time to quickly confirm the position of the receiver before releasing the ball, without giving the defense enough time to react.

Embodiments of the disclosed method and device are designed to discipline the quarterback by providing immediate feedback, should the quarterback look in the direction a pass play is intended to go, too soon. The disclosed method and device may also monitor growth and improvement as the solution provided tracks head movement errors and monitors how often the quarterback successfully does not telegraph a pass.

An exemplary embodiment of the disclosed device is a method and device for training a quarterback in American-style football. The device utilized in the method comprises a sensor that is mountable on a football helmet or other headgear such as a cap, hat, beanie, headband, sweatband, etc. and is used for detecting lateral head position and lateral head movement. The device further comprises a processor for processing data associated with the lateral head position and for processing data associated with lateral head movement which is communicatively connected to the sensor. The device further comprises a user interface, a memory storage device, and optionally a timer, each of which are in communication with the processor and sensor.

In some applications of the disclosed device, an inertial navigation system (INS) may be utilized to track position and orientation. The INS may comprise a computer and motion sensors, for example double or triple axis accelerometers. The INS system may calculate, via dead reckoning, the position, orientation, and velocity (orientation and speed of movement) of the head without the need for external references. In some applications of the disclosed system and method, the INS may comprise a gyroscope for determining orientation through the measurement of angular velocity.

Exemplary methods disclosed herein may include the step of choosing a particular play design. A play design may include: offensive formation, intended distance for a pass to be thrown, and intended direction for a pass to be thrown. The play design may be communicated to users such as the quarterback and the offense. The play design may be communicated or selected using a user interface for the device. The device is capable of processing information related to the play design against an algorithm and calculating a threshold range of allowable lateral head positions once the play begins. Once the desired drill or play begins, the device monitors the lateral movement of the quarterback's head by repeatedly sensing lateral head position and comparing the sensed data against the threshold range. In some embodiments, the monitoring can continue until a time limit expires. In some embodiments, the monitoring can continue until the threshold range of allowable lateral head positions is exceeded. In some embodiments, the monitoring can continue even after the threshold range of allowable lateral head positions is exceeded and may not end until a time limit expires.

In some or all embodiments, the quarterback or other users are notified in real-time if the threshold range of allowable lateral head positions is exceeded. For example, an audible alarm may sound or a visual cue such as a light may flash to notify the quarterback. In some embodiments, data related to the number of times the threshold range of allowable lateral head positions is exceeded can be recorded in a memory device and may be statistically processed at a later time to trend a particular quarterback's performance or for possible comparison against other quarterbacks. Embodiments of the disclosed methods may include performing multiple drills which may repeat play designs or also may incorporate different play designs. The level of difficulty may also be adjusted depending on how well the quarterback responds to the training by adjusting tolerances that feed in to the calculation of the threshold range of allowable lateral head positions.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

Before explaining embodiments of the system and method disclosed herein, it is to be understood that the subject matter is not limited in its application to the details of the particular arrangement shown, since the system and methods are capable of other embodiments. Exemplary embodiments are illustrated in referenced figures of the drawings. It is intended that the embodiments and figures disclosed herein are to be considered illustrative rather than limiting. For example, the discussion illustrates the method and devices using a football helmet, however, any suitable headgear capable of embodying the disclosed devices may be used. In some cases, such as those in which a user might not use a helmet, a cap, a hat, a sweatband, or a skull cap, etc. could be more suitable. Also, the terminology used herein is for the purpose of description and not of limitation.

FIG. 12A shows an exemplary embodiment of a user interface to carry out the disclosed methods.

FIG. 12B shows an exemplary embodiment of a user interface to carry out the disclosed methods.

FIG. 17A shows an exemplary embodiment of a user interface to carry out the disclosed methods.

FIG. 17B shows an exemplary embodiment of a user interface to carry out the disclosed methods.

FIG. 19B shows an exemplary embodiment of a user interface to carry out the disclosed methods.

FIG. 20 shows an exemplary embodiment of a user interface to carry out the disclosed methods.

DETAILED DESCRIPTION OF THE DRAWINGS

Figure 7:
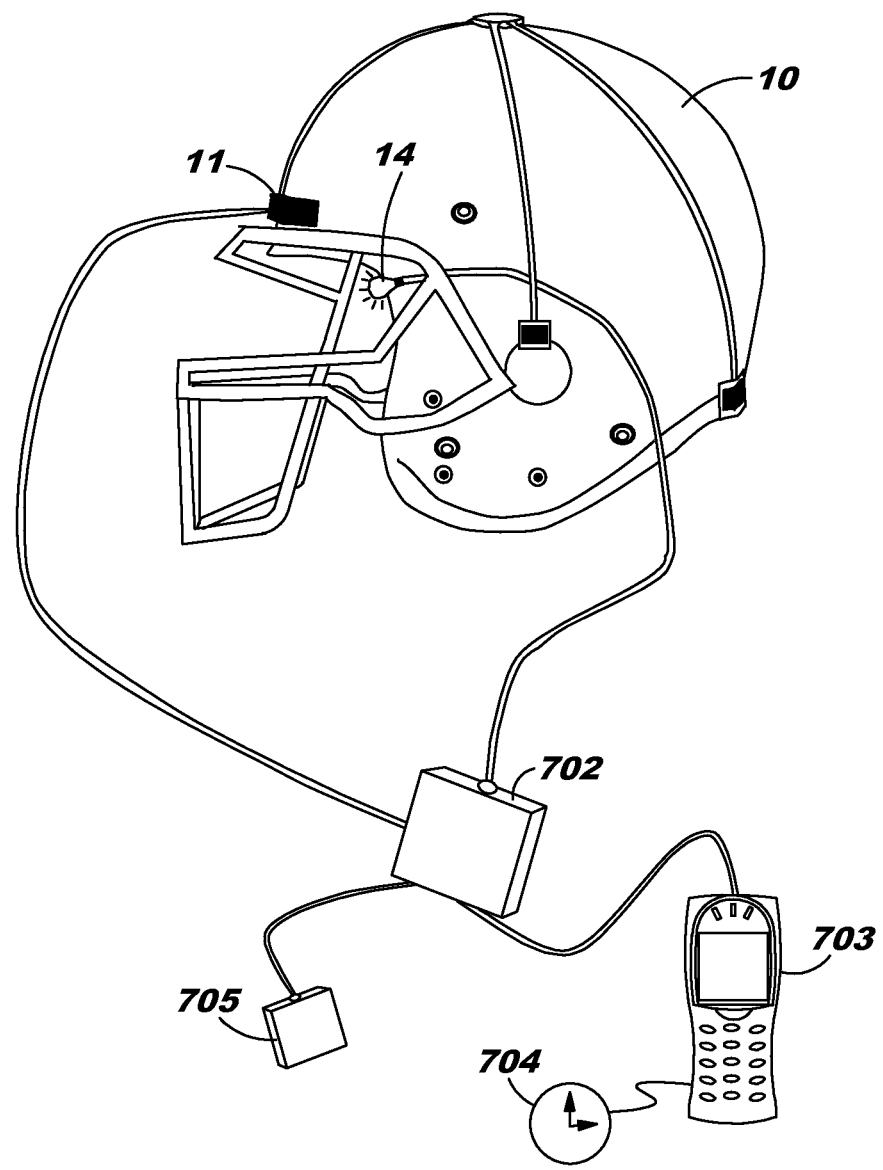
FIG. 7 shows an exemplary embodiment of the disclosed method.

Disclosed herein are exemplary embodiments of a method for training a quarterback in the game of American Football. In FIG. 7, the exemplary device comprises sensor 11 for detecting lateral head position and lateral head movement. Sensor 11 is mountable on headgear 10. The device further comprises processor 702 for processing data associated with the lateral head position and data associated with lateral head movement. Processor 702 is communicatively connected to Sensor 11. The device further comprises user interface 703 and memory storage device 705 (which may be mounted externally as shown or internally), each of which are in communication with processor 702 and sensor 11. Sensor 11 may comprise an accelerometer and/or a gyroscope. The disclosed device may further comprise a timer 704. In the exemplary embodiment illustrated in FIG. 7, visual alarm 14 comprises a light.

Figure 11A:
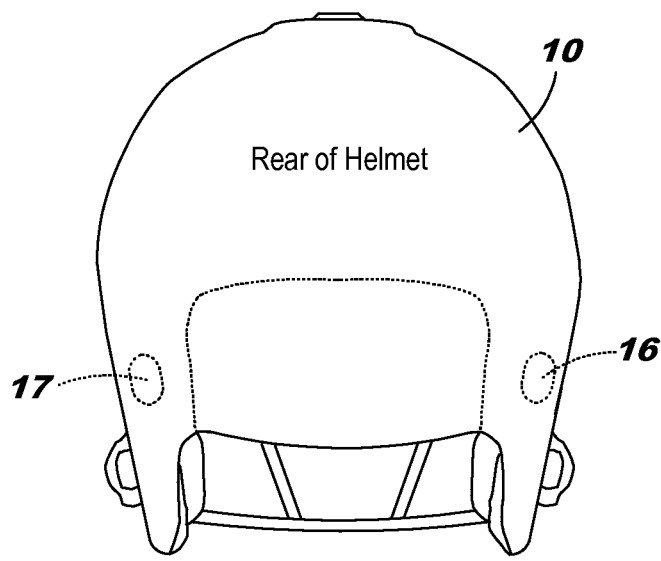
FIG. 11A shows an exemplary embodiment of how a sensor may be attached to headgear.
Figure 11B:
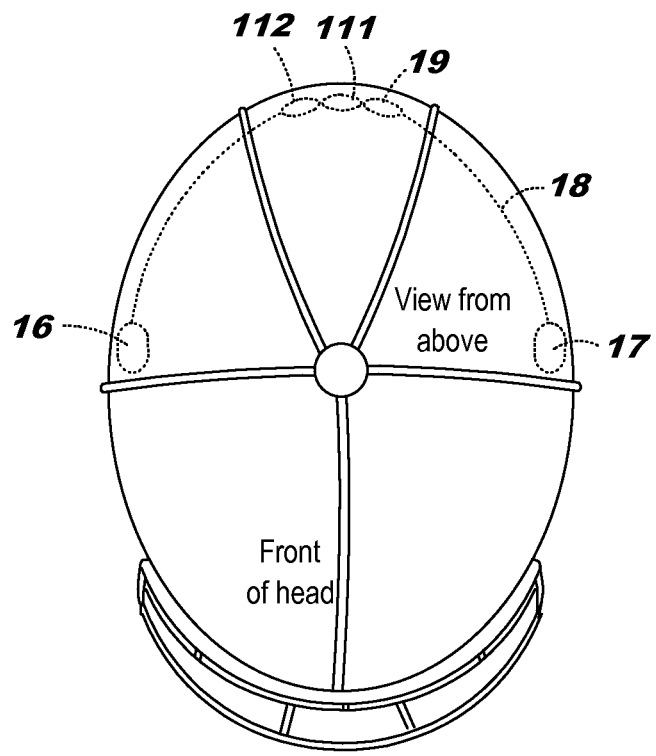
FIG. 11B shows an exemplary embodiment of how a sensor may be attached to headgear.

In exemplary embodiment shown in FIG. 11B, the exemplary device comprises transmitter/receiver 19 mountable on helmet/headgear 10. The transmitter receiver 19 may use technology such as blue tooth to send and receive signals/information, and may be connected to and recognize several (for example one to eight) other blue tooth devices. In some embodiments a receiver is initially set up to recognize the devices. Each device may be programmed with an address within a range of addresses.

Figure 2:
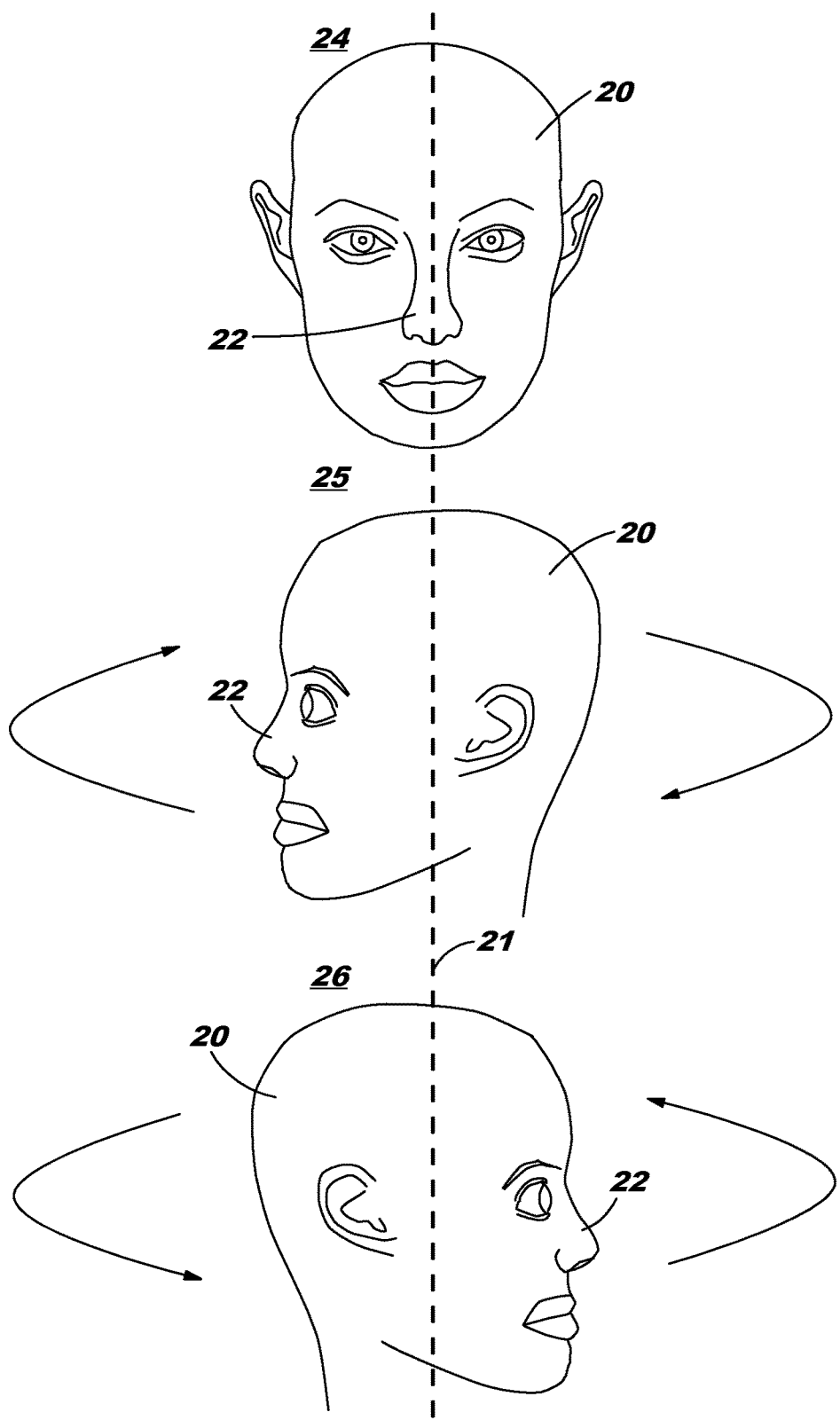
FIG. 2 illustrates lateral head rotation.

As used herein and depicted in FIG. 2, the term "lateral" with respect to head position means the direction a person's head 20 is facing with respect to rotation about an axis 21 that bisects the person's head from top to bottom as the person looks straight ahead or left or right. In some embodiments, a person's nose 22 may serve as a pointer to establish a resulting direction or position when rotated past a baseline or threshold point in comparison to a pass direction.

Figure 3:
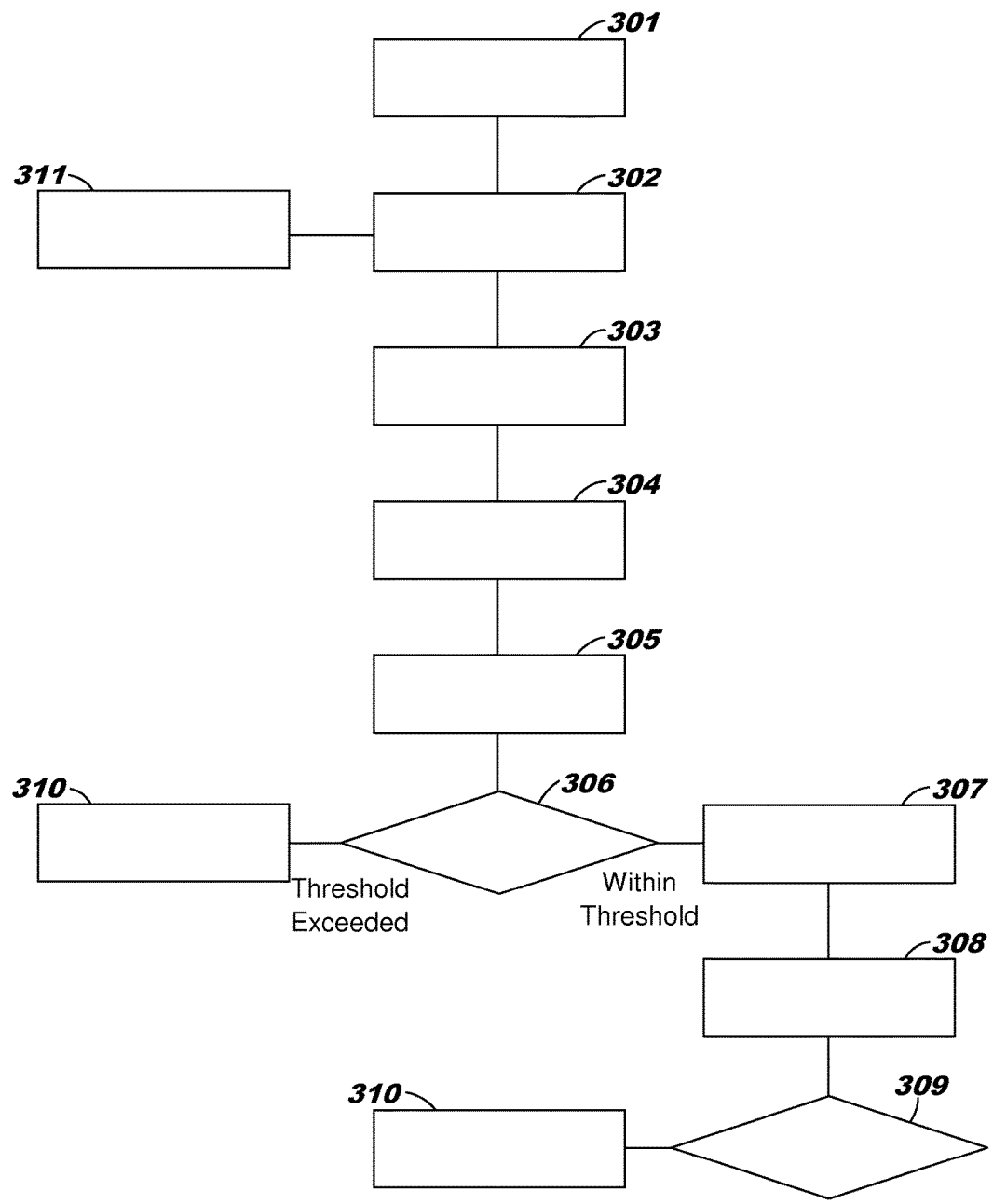
FIG. 3 shows an exemplary embodiment of the disclosed method.

FIG. 3 illustrates an exemplary embodiment of the disclosed method. The method comprises a step 301 of selecting a first play design. The first play design has at least a first direction for a pass to be thrown. The method further comprises a step 302 of communicating the first play design to a user such as a quarterback, or a coach. The communication may be performed automatically by the device, or person to person. The method further comprises a step 303 of communicating the first play design to the device. This may be done by selecting from information already present in the user interface, for example a pull down menu, or by entering each variable of a particular play design individually. The exemplary method comprises a step 304 of establishing a first threshold range of allowable lateral head positions based on the first play design. A first lateral head position may be detected with the device in step 305. The exemplary embodiment comprises a step 306 in which the device processes data associated with the first lateral head position and may comprise a step 307 of determining that the first lateral head position does not exceed the first threshold range of lateral head positions. The disclosed method comprises a step 308 where the device detects data indicating lateral head movement resulting in a second lateral head position. In an additional step 309 of the exemplary method, the device processes data associated with the second lateral head position and may determine that the second lateral head position exceeds the first threshold range of allowable lateral head positions. If it is determined (for example in steps 306 or 309) that the second lateral head position exceeds the first threshold range of allowable lateral head positions, the method comprises a step 310 where the device communicates a message indicative that the first threshold range of allowable lateral head positions is exceeded. This communication may be an audible or visual alarm communicated to users including the coach and quarterback. The communication may also, for example, be in the form of data stored in an internal or external memory storage unit that may be statistically processed at a later time or viewed by only the coach or another user not located on the field.

Figure 1A:
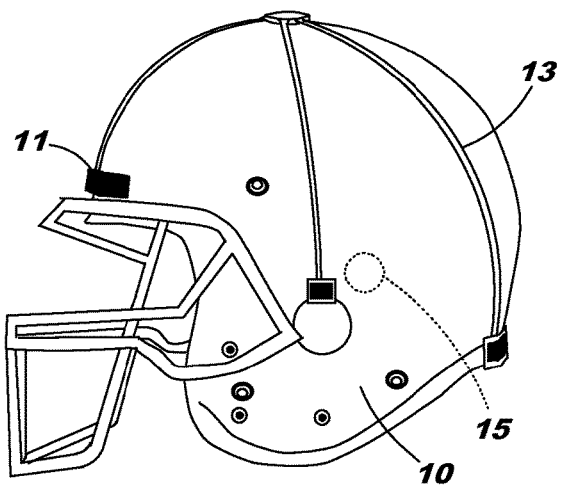
FIG. 1A shows an exemplary embodiment of how a sensor may be attached to headgear, here, a football helmet.
Figure 1B:
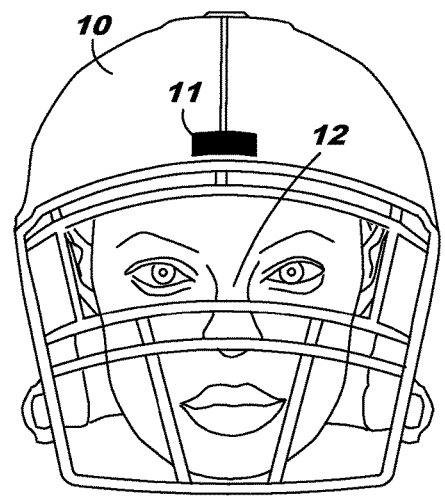
FIG. 1B shows an exemplary embodiment of how a sensor may be attached to headgear.
Figure 1C:
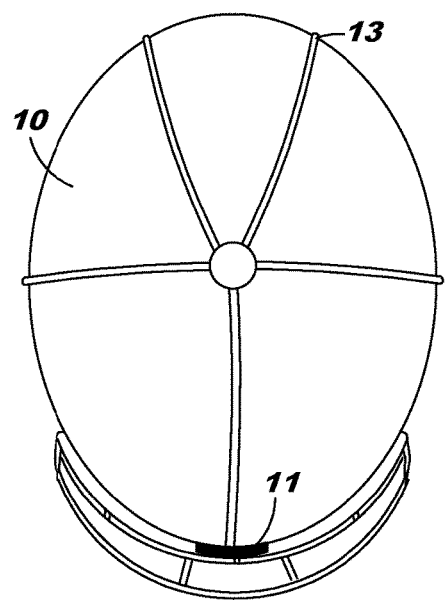
FIG. 1C shows an exemplary embodiment of how a sensor may be attached to headgear.

As described above, an exemplary embodiment of the disclosed method is carried out with a device having sensors that are mountable on a football helmet. As shown in FIGS. 1A-1C, sensors 11 may be attached to a traditional football helmet 10 using bungee-cord system 13, although other mounting systems could be implemented. The sensors could also be semi-permanently mounted with glue or screws or could be attached to helmet 10 by some other means that would allow the device to remain in place while the user ran pass plays. Depending on the sensor employed, sensors 11 may be mounted on the inside or outside of the helmet.

Embodiments of the device comprise sensor 11 for detecting lateral head position and lateral head movement, along with a processor 702 (see also FIG. 7) for processing data associated with the lateral head position and data associated with lateral head movement. Sensor 11, which gauges horizontal head/helmet movement, i.e. lateral head movement and position, and monitors the direction the head/helmet is pointed during every phase of a forward pass, may be mounted in line with and above wearer's nose 12 as shown in FIG. 1B. Embodiments of sensors 11 could be removable and interchangeable with any number of helmet systems. In this embodiment, helmet 10 comprises one or more optional speakers 15.

As can be appreciated, the device may be worn by a user in a variety of different ways. Different options may depend on convenience and ease of attachment to the headgear. FIGS. 11A and 11B show an exemplary option for how the disclosed device may be placed on a helmet 10. FIG. 11A shows helmet 10 as viewed from the back. Alternative embodiments to speaker 15, (see FIG. 1A), can take the form of buzzers 16 and 17 which may be positioned behind the left and right ear of a user. The right and left buzzers 16, 17 may be in active or dormant states. When in an active state, a buzzer may be on or off. When in the active state, if the user turns his/her head into a disallowed zone (e.g. exceeding the threshold range), a buzzer can be activated. In a first option, a buzzer may turn off after a certain amount of time (e.g. a timer runs out). In a second option, a buzzer may turn off after the user turns his/her head out of the disallowed zone. The system may utilize either the first and second option or a different option to stop a buzzer. In some embodiments, the system can comprise a mechanism which stops the alarm when either the timer is activated or the user moves his/her head out of the disallowed zone. As stated above, any headgear capable of embodying the present device, such as a cap, hat, band, etc. can be used.

The exemplary device of FIG. 11B comprises an INS shown from above. A double or triple axis accelerometer 111 is mounted to the rear of a helmet. Accelerometer 111 may be powered by a battery 112. An electric signal may be sent to left buzzer 17 or right buzzer 16 to activate the buzzers indicating that a threshold range has been exceeded. Although wires 18 are shown to illustrate communication means between the buzzers and the INS, it is possible that the communication means could be wireless as well. In this exemplary embodiment transmitter receiver 19, accelerometer 111, and battery 112 may be attached to the inside of the helmet 10.

Embodiments of the disclosed device comprise at least one user interface. In one example, a user interface may allow at least one user such as a coach, trainer, scout, or player to visualize quarterback head movement data. The user interface may also allow the user to import, export, store, and/or download actual measurements of real-time or stored lateral head movement data. In another embodiment, the user interface may allow users to enter information into the device related to a type of play design that is desired to be run and at least one user to receive information related to the type of play design that is desired to be "practiced". In other examples, an exemplary user interface may allow at least one user to be notified if the quarterback's head moves improperly compared to the desired training goals for a particular play. Further embodiments can allow at least one user to view data associated with the performance of a particular quarterback related to the number of times the quarterback's head was properly or improperly positioned prior to the ball being thrown during training drills.

An exemplary user interface 703 (See FIG. 7) utilized by a coach, may be incorporated with a hand-held computer, a smart phone, a tablet, a standalone transmitting/receiving device designed specifically for this use only, a desktop or laptop computer, cell/mobile/smart phone, or similar device. It is contemplated that the smaller the device, the easier it would be for a coach to utilize on the field where the coach can also be in constant person to person communication with the quarterback. That is not to say it also would not be worthwhile to have someone "in the booth" coordinating drills remotely while coaches are focusing on more than just the quarterback. In some embodiments of the disclosed method and device, historical data may be more accessible and easily viewed from larger screens than that which may be found on hand held devices.

Exemplary embodiments of the disclosed device comprise a memory storage device 705 (occasionally also referred to herein as a memory storage unit) which is capable of storing data associated with lateral head position and lateral head movement. Memory storage device 705 may store information related to every time a quarterback successfully practices a play without improper head movement or positioning prior to throwing the ball. Memory storage device 705 may also store information related to every time a quarterback fails to maintain proper head movement or positioning prior to throwing the ball. In some embodiments this information is processed real-time with immediate feedback given to users of the device. In addition this information may be processed real-time but stored in memory storage device 705 for later statistical analysis and record keeping. This allows for later analysis of the skills of a particular quarterback and the quarterback's performance level, possibly in comparison to another quarterback. In some embodiments, users are not notified real-time of proper or improper head movement or positioning. Instead, data is preserved by memory storage device 705 for later analysis.

It is contemplated that the methods disclosed herein may require the offense to set up a particular play. It should be appreciated that depending on the goals of a particular drill, a defense may or may not be used during the drill. At a minimum, a ball thrower, which in most instances is the quarterback, is needed. In one example, the center may snap the ball to the quarterback to initiate the play. Methods disclosed herein will likely work with most drill scenarios used in conjunction with training the quarterback to control head movement, as well as typical drills used to practice particular pass plays. Irrespective of how many offensive or defensive players are present on the field at the time of a particular drill, embodiments disclosed herein are likely to comprise the step 301 of selecting or creating a first play design.

In some embodiments, a particular play design may have three elements: formation, direction, and distance. Formation is the alignment of the quarterback and the offensive teammates before the center delivers or hikes the football to the quarterback and the play commences. The formation variable may appear to the user as simply left, right, or center, similarly to the area of the field towards where the ball is about to be thrown. Distance is the number of yards the football will or is likely to travel from quarterback to the desired receiver, again as determined by the play design. Depending on the configuration of the user interface, these values may be individually inputted or selected from a predefined list, or they may be pre-programmed for a particular named set of drills or plays. At a minimum, the play design should at least include a direction for a pass to be thrown. These elements will serve as "variables" in calculations made to establish acceptable tolerances and thresholds for head movement. They are inputted or selected by a user, for example, through user interface 703 (see FIG. 7) when establishing a play design. Software utilized by processor 702 may use these variables in algorithms to determine threshold ranges of allowable lateral head positions based on the play design. An optional fourth variable, which also may be used to calculate an acceptable threshold range, can be a level of difficulty. For example, if a quarterback appears to regularly meet goals associated with not looking directly where the ball is about to be thrown, the quarterback or a coach may want to further challenge the quarterback by raising the level of difficulty to require the quarterback to look even further away from where the ball is to be thrown. One benefit to this would be an effort to practice "tricking" the defense into shifting in a direction completely opposite of where the ball is about to be thrown. This example of "looking left to throw right" is counterintuitive to what a quarterback's natural tendency might be prior to training with the disclosed methods and devices. It is expected that through repetition and practice, looking away from the desired throwing direction will become more natural to the thrower.

As described above, the variables involved in the play selection step of the disclosed methods may include but are not limited to: direction, formation, and distance. Direction may be a particular vector, but may also be viewed as an area of the playing field that an attempted pass is designed to be thrown. This could mean the right, left, or center part of the playing field relative to the positioning of the quarterback prior to the start of the play. In some embodiments, the start of the play most likely would be the delivery of the football from the center to the quarterback (a hike or a snap). Other embodiments may have more or less specificity associated with a particular direction based on tolerances. Tolerances may also be a configurable option, for example, through user interface 703, or may be predetermined and/or preset into the system.

Software that is a part of, or used in conjunction with, the disclosed device may process and measure data points against the variables described above to determine if enough of a deviation, from the desired lateral head/helmet position, has occurred to warrant an alarm. When combined with and calculated with the processor and software of the device, the variables determine which head/headgear positions are acceptable across a horizontal axis, for example, and which are not. In turn these acceptable head/headgear positions ultimately determine whether a lateral head position exceeds the first threshold range of allowable lateral head positions.

Based on the goals of a user such as the quarterback, trainer, or coach, the threshold range can be adjusted to suit a particular situation through software designed to interface with sensor 11 and user interface 703. As mentioned above, the individual entering information into user interface 703 can enter individual play plans, enter a list of play designs to follow in a particular order, request that a drill or play design be repeated, or delete a play design.

Referring again to FIG. 3, step 302 comprises communicating the first play design to a user. The user may be the quarterback, or the coach, or a trainer, or a scout, or many possible people involved in the training or evaluation of a quarterback related to body or head movement prior to passing the ball.

Step 311 may comprise storing in a memory 705, the first play design, the data associated with the first lateral head position, the data associated with the second lateral head position, and/or data indicating that the first threshold range of allowable lateral head positions is exceeded.

Step 303 comprises communicating the first play design to the device. As described above, this may include inputting the first play design into the device through user interface 703 by identifying the desired variables to alter and the value of each variable. The methodology could include selecting from a predefined set of plays. The information may be presented in "pull down" types of menus or other ways of selecting appropriate information to construct a play design. The information may also be manually entered to communicate the first play design to the device. Additional play designs may follow if desired. Therefore, it should be appreciated that previously run play designs may be stored and reused as appropriate.

Step 304 comprises establishing a first threshold range of allowable lateral head positions based on the first play design. This can be done by processing appropriate algorithms previously programmed and stored within the disclosed devices.

Step 305 comprises detecting a first lateral head position with the device. This position might be straight down the field, an example of which is shown in FIG. 2 as position 24. The position might also be left or right or straight down the field, and may be angularly measured, possibly based somewhat on the direction the quarterback's nose is pointed. Other intermediary positions are possible as well.

Step 306 comprises processing data associated with the first lateral head position, and possibly determining in another step 307 that the first lateral head position does not exceed the first threshold range of lateral head positions.

Step 308 comprises detecting with the device, data indicating lateral head movement resulting in a second lateral head position. This position might be straight down the field, an example of which is shown in FIG. 2 as position 24. The position might also be left or right of straight down the field, and may be angularly measured, possibly based somewhat on the direction the quarterback's nose is pointed. Other intermediary positions are possible as well.

Step 309 comprises processing with the device, data associated with the second lateral head position and determining that the second lateral head position exceeds the first threshold range of allowable lateral head positions.

In one example, the disclosed method may determine that the second lateral head position exceeds the first threshold range of allowable lateral head positions, whereupon the system may communicate a message indicative that the first threshold range of allowable lateral head positions is exceeded, as provided for in step 310. This message may be communicated with an alarm or through a text message which may be stored for future analysis. As previously mentioned, users may be notified immediately or in real time, should the quarterback improperly position or move the quarterback's head prior to throwing the ball. Alarms notifying the quarterback may include but not be limited to audible sounds, visual alarms such as lights, or physical notifications such as vibrations or even shocks.

As described above in embodiments of the method disclosed, a play design may comprise a pass direction, but may also comprise a first offensive formation and/or a first distance for the pass to be thrown.

It should be appreciated that the methods disclosed may base the threshold range of allowable lateral head positions not just on pass direction, formation, and distance, but may also base the threshold on one or more desired levels of difficulty.

Figure 13:
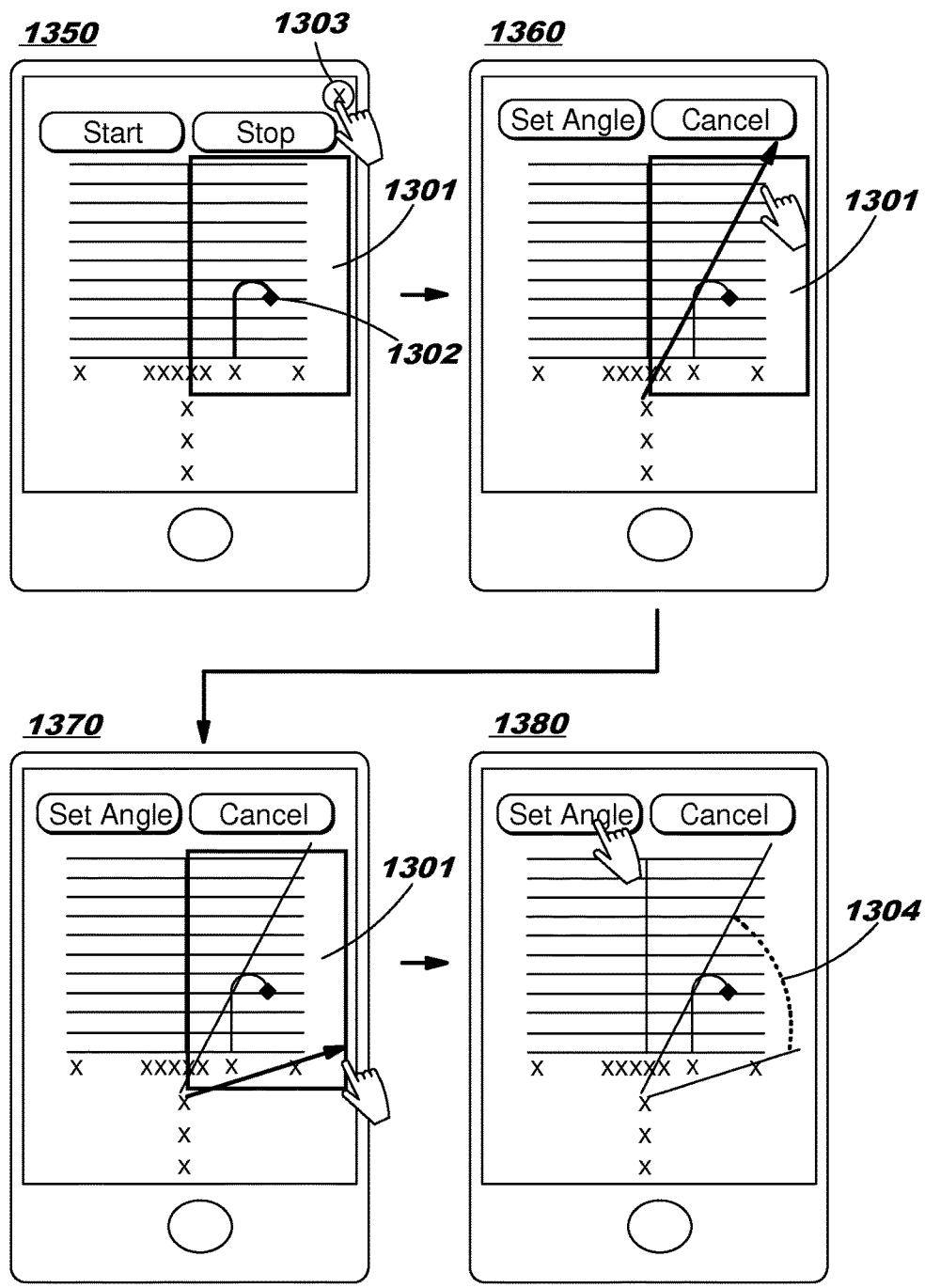
FIG. 13 shows an exemplary embodiment of a user interface to carry out the disclosed methods.

FIG. 13 depicts an example of a user interface contemplated by the disclosure to set an exemplary "Disallowed Zone" using data about the play, the receiver, and the receiver's route and distance. The "boxed in" area 1301 of the diagrams display the Disallowed Zone (where an alarm or buzzer would activate if the quarterback turns his/her head in that direction) based on a particular receiver in a specific play. In some embodiments a quarterback may scan though the Disallowed Zone without activating the alarms as long as the he/she does not fixate in one point for more than the time in a fixation timer. The fixation timer may be set per individual quarterback.

To illustrate, assume 0° is calibrated to point to Goal Post 1, and 180° is calibrated to point to goal post 2. If the user/administrator has selected the first goal post (see the exemplary device 1560 of FIG. 15A), the default Disallowed Zone is from 270° to 0° or from 0° to 90°, depending on the Receiver's route. If the user/administrator has selected the second goal post (see the exemplary device 1560 of FIG. 15A), the default Disallowed Zone is from 360° to 180° or from 180° to 270°, depending on the Receiver's route. In the exemplary diagram 1350, target receiver 1302 is supposed to end up in the right quadrant, therefore the Disallowed Zone is from 0° to 90° right.

Here, icon 1303 may be used to adjust the angle of the Disallowed Zone. Diagrams 1350, 1360, 1370, and 1380 of FIG. 13 show exemplary embodiments displaying how an administrator or user can adjust the angle of the Disallowed Zone. The administrator/user may do this in order to allow a less experienced athlete more leeway in looking in different directions on the field. For example, the administrator/user may make the Disallowed Zone smaller by making the angle 1304 more acute than 90°.

Figure 4:
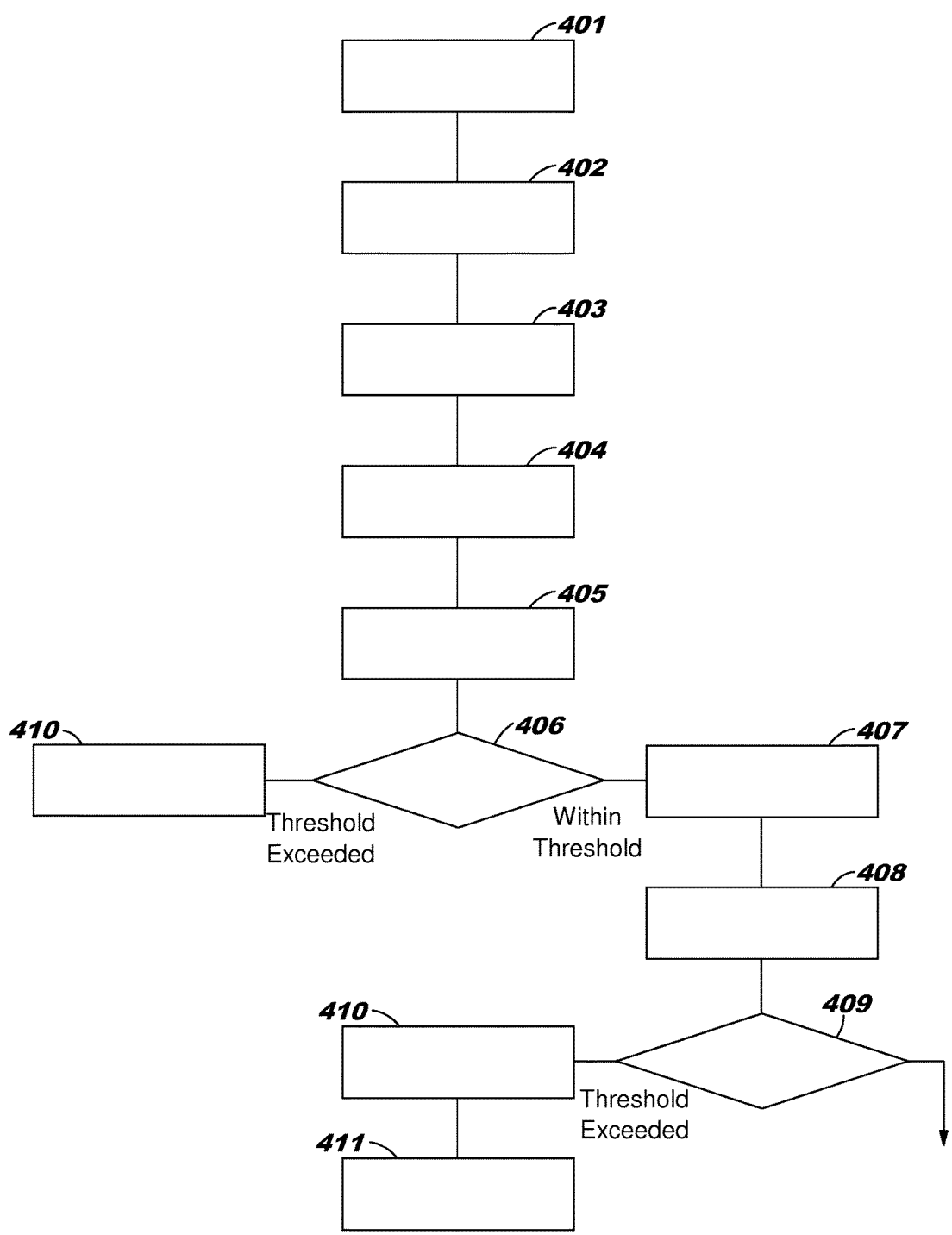
FIG. 4 shows an exemplary embodiment of the disclosed method.

As discussed above, looking one direction while preparing to throw a ball in the other direction is counterintuitive. Therefore in order to overcome the tendency, the quarterback will likely need to practice the steps of the disclosed methods again and again. It should be appreciated that after completion of one drill, with one play design, that it would be likely for a second drill to be started having a new play design, or even repeating the previous one. FIG. 4 depicts another example of the method disclosed herein. Step 401 comprises creating an exemplary second play design, which may, for example, have a second direction for a pass to be thrown. Step 402 comprises the action of communication of the second play design to a user. Step 403 comprises the communication of the second play design to the device. Step 404 comprises establishing a second threshold range of allowable lateral head positions based on the second play design. Step 405 comprises detecting with the device, a third lateral head position, which in actuality may be the first lateral head position of the new drill. Step 406, comprises the processing of data associated with the third lateral head position by the device which may determine in step 407 that the third lateral head position does not exceed the second threshold range of lateral head positions. It may also be determined in step 410 that the second threshold range of lateral head positions has been exceeded. In step 408, the device may detect data indicating lateral head movement resulting in a fourth lateral head position. In step 409, the device processes data associated with the fourth lateral head position and may determine in step 410 that the second threshold range of allowable lateral head positions has been exceeded. Step 411 comprises communicating a message indicative that the second threshold range of allowable lateral head positions is exceeded.

Figure 5:
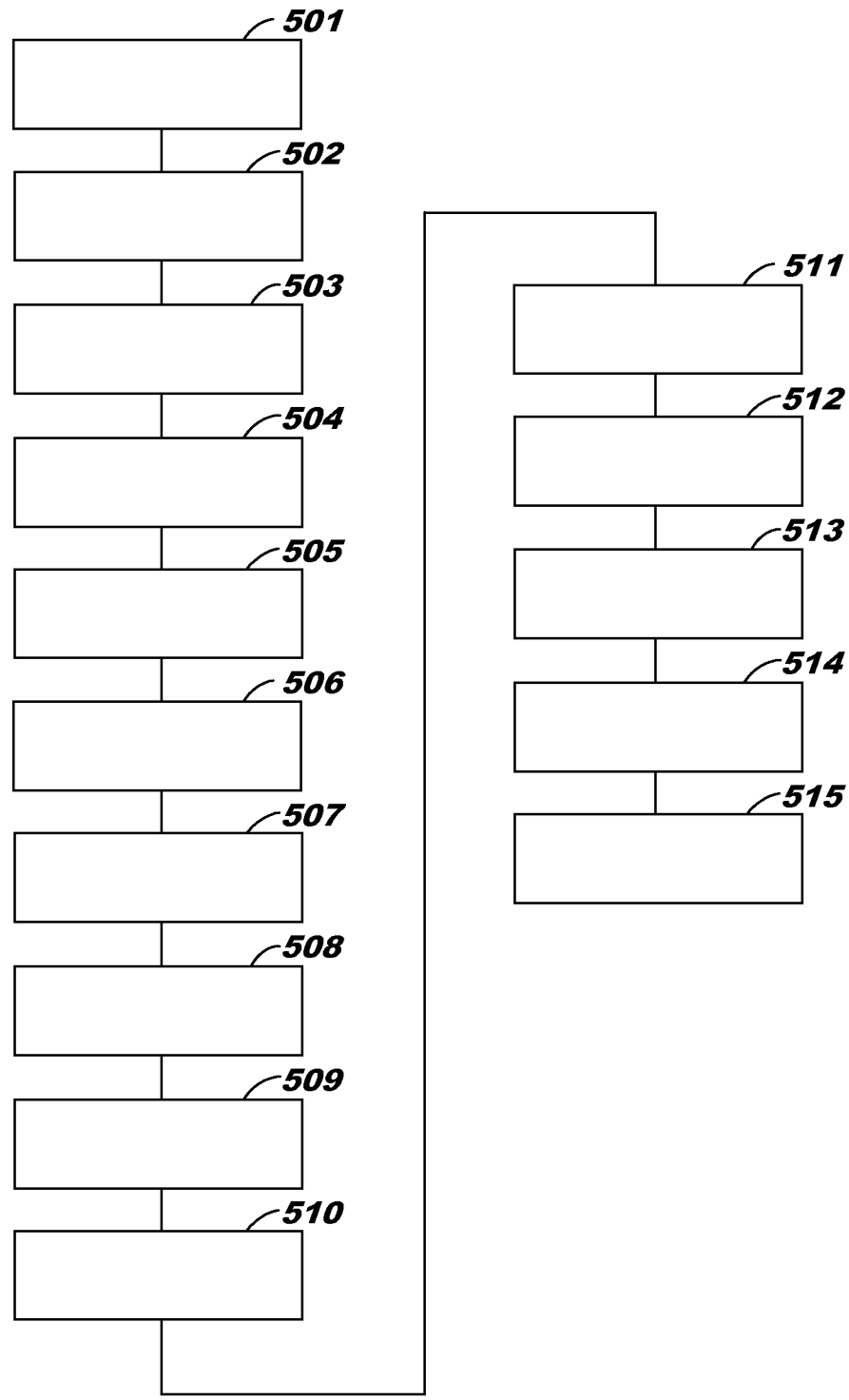
FIG. 5 shows an exemplary embodiment of the disclosed method.

It is contemplated that the device may further comprise a timer 704. FIG. 5 depicts another example of the methods disclosed herein, which may be in addition to the steps shown in FIGS. 3 and 4, and includes step 501 of setting the timer 704 for a first time period. The first time period may be defined as the duration that the device will actively detect lateral head position. It should be appreciated that the quarterback will eventually need to be free to be able to turn his/her head without setting off alarms. It should also be appreciated that only a few seconds occur between the snap initiating the play and the quarterback being ready to throw the ball. If the quarterback has successfully looked in an "allowable" direction for a long enough period of time, it is likely that the defense will have shifted that direction. In this case and as discussed above, even if the quarterback briefly looks where he is going to throw the ball at the last moment, it is not likely that the defense will have enough time to be able to shift back into position, even if they do anticipate the pass at the last second. Thus, timer 704 (see FIG. 7) can be set for any duration, for example three or less seconds, between three to five seconds, five or less seconds, or less than 10 seconds. Here, step 502 comprises starting timer 704 for a time period, perhaps a first time period of several. Step 503 comprises stopping the timer 704 concurrently with when the first threshold range of allowable lateral head positions is exceeded. Alternatively step 503 may also comprise stopping the timer 704 if the time duration expires.

In an exemplary embodiment, the disclosed device starts detection and may also start a timer when an observer such as the coach or someone "up in the box" starts the device. In other embodiments this may be automated or controlled by the quarterback.

In some cases, first play designs and subsequent play designs may be the same. This allows for a particular play or drill to be practiced multiple times. As discussed above, play designs may comprise one or more of the following: a pass direction, an offensive formation and a distance for the pass to be thrown.

An exemplary method shown in FIG. 5 discloses step 504 comprising selecting a second or subsequent play design. The subsequent play design might have a second direction for a pass to be thrown or the same direction for a pass to be thrown, or additional variables as described above. Step 505 comprises communicating the second play design to a user. Step 506 comprises communicating the second play design to the device. Step 507 comprises setting the timer 704 for a subsequent time period. The subsequent time period as described above, may be defined as a length of time that the device will actively detect lateral head position. Step 508 comprises establishing a second or subsequent threshold range of allowable lateral head positions based on the second or subsequent play design. Step 509 comprises starting the timer 704. Step 510 comprises detecting a third or subsequent lateral head position with the device. Step 511 comprises processing with the device, data associated with the third or subsequent lateral head position and may determine that the third or subsequent lateral head position does not exceed the second threshold range of allowable lateral head positions. Step 512 comprises detecting with the device, a fourth or subsequent lateral head position. Step 513 comprises processing with the device data associated with the fourth or subsequent lateral head position and may determine that the fourth lateral head position does not exceed the second threshold range of allowable lateral head positions. Eventually step 514 which comprises stopping the detection of lateral head movement with the device concurrently with expiration of the subsequent time period occurs. Step 515 comprises communicating with the device, a message indicative that the second threshold range of allowable lateral head positions was not exceeded during the subsequent time period.

In some embodiments, when there exists a message indicative of a threshold range of allowable lateral head positions being exceeded, the message may be communicated to the user. Alternatively or in addition to, the message may also be communicated to memory storage device 705.

As disclosed herein, the device may comprise a communication means or an alarm 14 capable of communicating messages to the quarterback. Thus messages indicative that a threshold range of allowable lateral head positions is exceeded may be communicated to the quarterback. Additionally, information such as a play design may be communicated to the quarterback. The communication means may be through blue tooth, or wireless radio, or similar technology and may be presented for example though a speaker 15 in the quarterback's helmet or other headgear, as shown in FIG. 1A.

As discussed briefly above, the disclosed methods may utilize user interfaces 703 comprising a hand-held computer etc. allowing a coach to perform the step of commutating the first play design to the device. A hand-held computer could be a smartphone or tablet or a custom designed stand-alone device. User interfaces 703 may comprise a similar hand-held computer which would allow a quarterback to perform the step of communicating the first play design to the device.

It should be appreciated that any subsequent messages of the disclosed methods, in particular those shown in FIG. 5, which indicate that subsequent threshold ranges of allowable lateral head positions have been exceeded may be communicated to a memory storage device for later data analysis. Additionally and or alternatively, communication means 14 which are capable of communicating messages to the quarterback include but are not limited to being an audible alarm, a flashing light, a static light, a shock or vibration.

Figure 6:
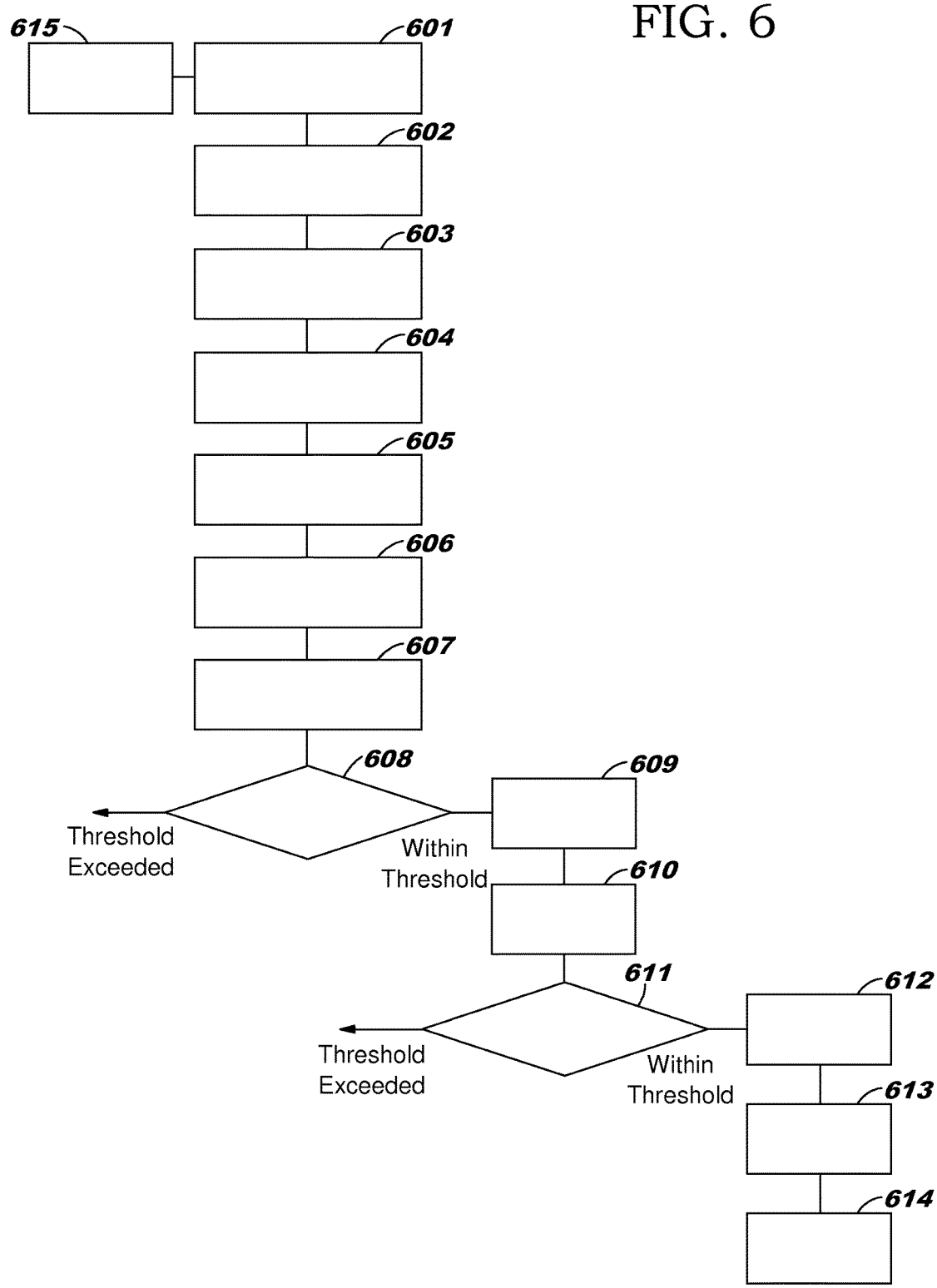
FIG. 6 shows an exemplary embodiment of the disclosed method.

FIG. 6 depicts another example of the methods disclosed herein. As shown in FIG. 7, the sensor portion of device 11 is mountable on a football helmet 10. Sensor 11 detects lateral head position and lateral head movement. Sensor 11 is communicably coupled to Processor 702 for processing data associated with the lateral head position and data associated with lateral head movement. User interface 703 is communicably coupled to processor 702, timer 704, and optionally memory storage device 705. It should be appreciated that the components may be communicably coupled with physical wires, through wireless means, or a mixture of the various mechanisms. Memory storage device 705 may be a cd, dvd, USB drive, hard drive, embedded memory, memory chip, flash drive, or other similar device. The aforementioned components are also previously described.

FIG. 6 comprises the step 601 of selecting a first play design. The first play design has at least a first direction for a pass to be thrown. Step 602 comprises communicating a first play design to a user. Step 603 comprises communicating the first play design to the device. Step 604 comprises setting a timer 704 for a first time period. The first time period is defined as a duration during which that the device may actively detect lateral head position. Step 605 comprises establishing a first threshold range of allowable lateral head positions based on the first play design. Step 606 comprises starting a timer 704. Step 607 comprises detecting a first lateral head position with the device. Step 608 comprises processing data associated with the first lateral head position and may determine in a step 609 that the first lateral head position does not exceed the first threshold range of allowable lateral head positions. Step 610 comprises detecting a second or subsequent lateral head position with the device. Step 611 comprises processing data associated with the second or subsequent lateral head position and it may be determined in a step 612 that the second or subsequent lateral head position does not exceed the first threshold range of allowable lateral head positions. Step 613 comprises stopping detection of lateral head movement with the device concurrently with expiration of the first time period. Step 614 comprises communicating with the device, a message indicative that the first threshold range of allowable lateral head positions was not exceeded during the first time period.

As described above, the first time period or subsequent time periods may vary and can be less than about three seconds. In exemplary embodiments, the timer may be started concurrently with a football being snapped to the quarterback.

As with other embodiments disclosed herein, the first play design may also comprise a first offensive formation, and/or a first distance for the pass to be thrown. In addition, exemplary embodiments may further comprise the step 615 which comprises inputting one or more desired levels of difficulty, and wherein the first threshold range of allowable lateral head positions is also based level of difficulty. The user interface 703 may comprise a hand-held computer, as discussed above, allowing a coach to perform the step of communicating the first play design to the device. Step 606 comprising starting the timer may be completed by a coach through the user interface 703.

It is contemplated that the methods shown in FIGS. 8, 9, and 10 described below as well as the methods shown in FIGS. 3, 4, 5, and 6 described above may be carried out in conjunction with a device as shown in FIG. 7 comprising sensors 11 mountable on a football helmet 10 (or other headgear). The device further comprises processor 702 for processing data associated with the lateral head position and data associated with lateral head movement. Processor 702 may be communicably coupled to sensor 11 for detecting lateral head position and lateral head movement, a user interface 703, a timer 704 and a memory storage device 705. It should be appreciated that the components may be communicably coupled with physical wires, through wireless means, or a mixture of the two. The memory storage unit 705 may be a cd, dvd, USB drive, hard drive, embedded memory, memory chip, flash drive, or other similar device.

Figure 8:
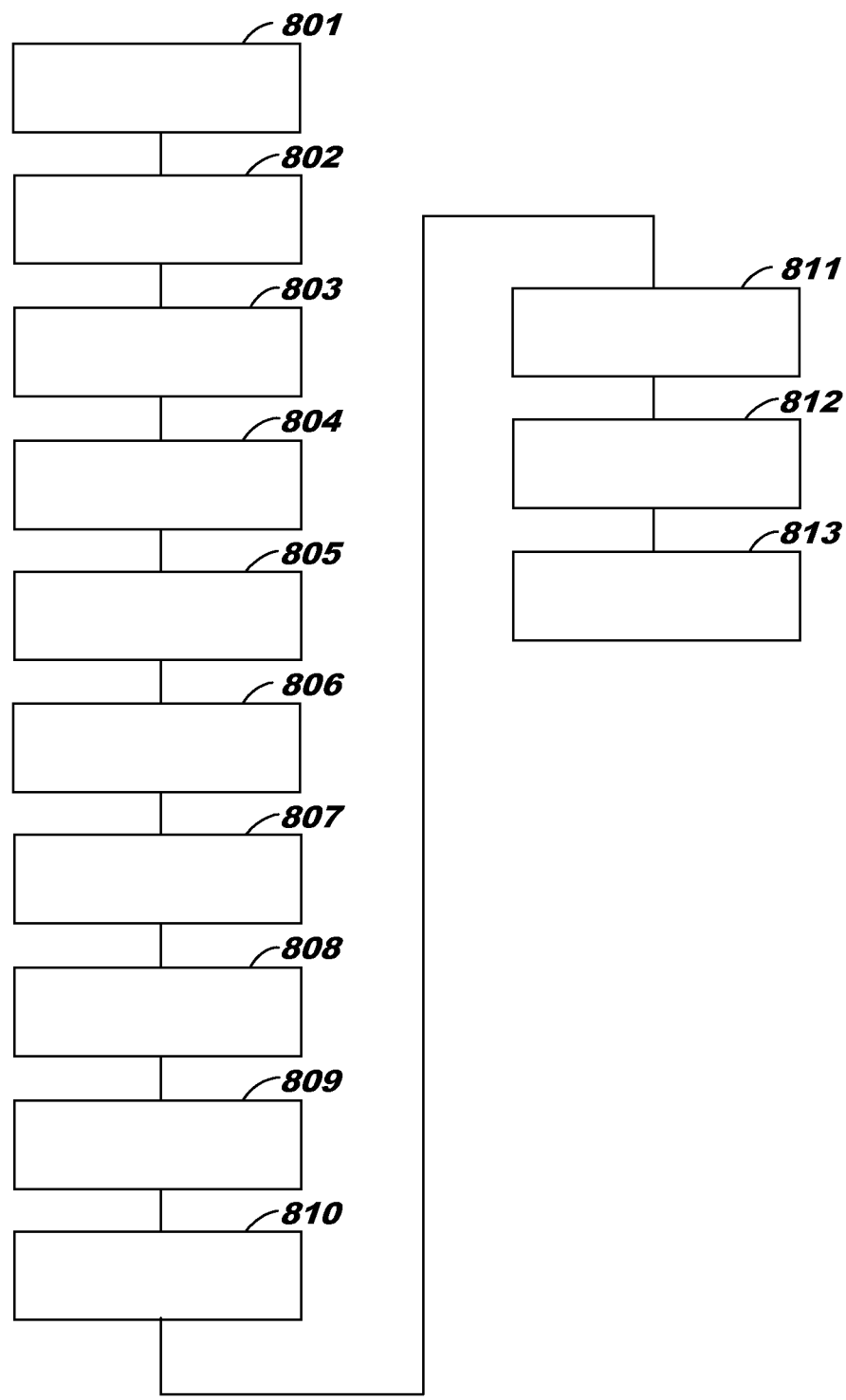
FIG. 8 shows an exemplary embodiment of the disclosed method.

FIG. 8 depicts another example of the methods disclosed herein and comprises a step of selecting a first play design 801. The first play design has at least a first direction for a pass to be thrown. Step 802 comprises communicating the first play design to a user. Step 803 comprises communicating the first play design to the device. Step 804 comprises establishing a first threshold range of allowable lateral head positions based on the first play design. Step 805 comprises detecting with the device, a first lateral head position. Step 806 comprises processing with the device, data associated with the first lateral head position, comparing the first lateral head position to the first threshold range of allowable lateral head positions, and step 807 comprises recording a first result of the comparison in a memory storage unit 705. Step 808 comprises detecting a subsequent lateral head position with the device. Step 809 comprises processing data associated with the subsequent lateral head position. Step 810 comprises comparing the subsequent lateral head position to the first threshold range of allowable lateral head positions. Step 811 comprises recording a subsequent result in a memory storage unit 705. Step 812 comprises stopping detection of lateral head movement. Step 813 comprises communicating with the device, recorded data indicative of whether the first threshold range of allowable lateral head positions is exceeded.

In an exemplary embodiment, the method described above may further comprise the step of manipulating the recorded data for statistical purposes. Subsequently recorded data may also be manipulated and stored. Alarms may also occur should thresholds be exceeded even though data is being recorded.

Figure 9:
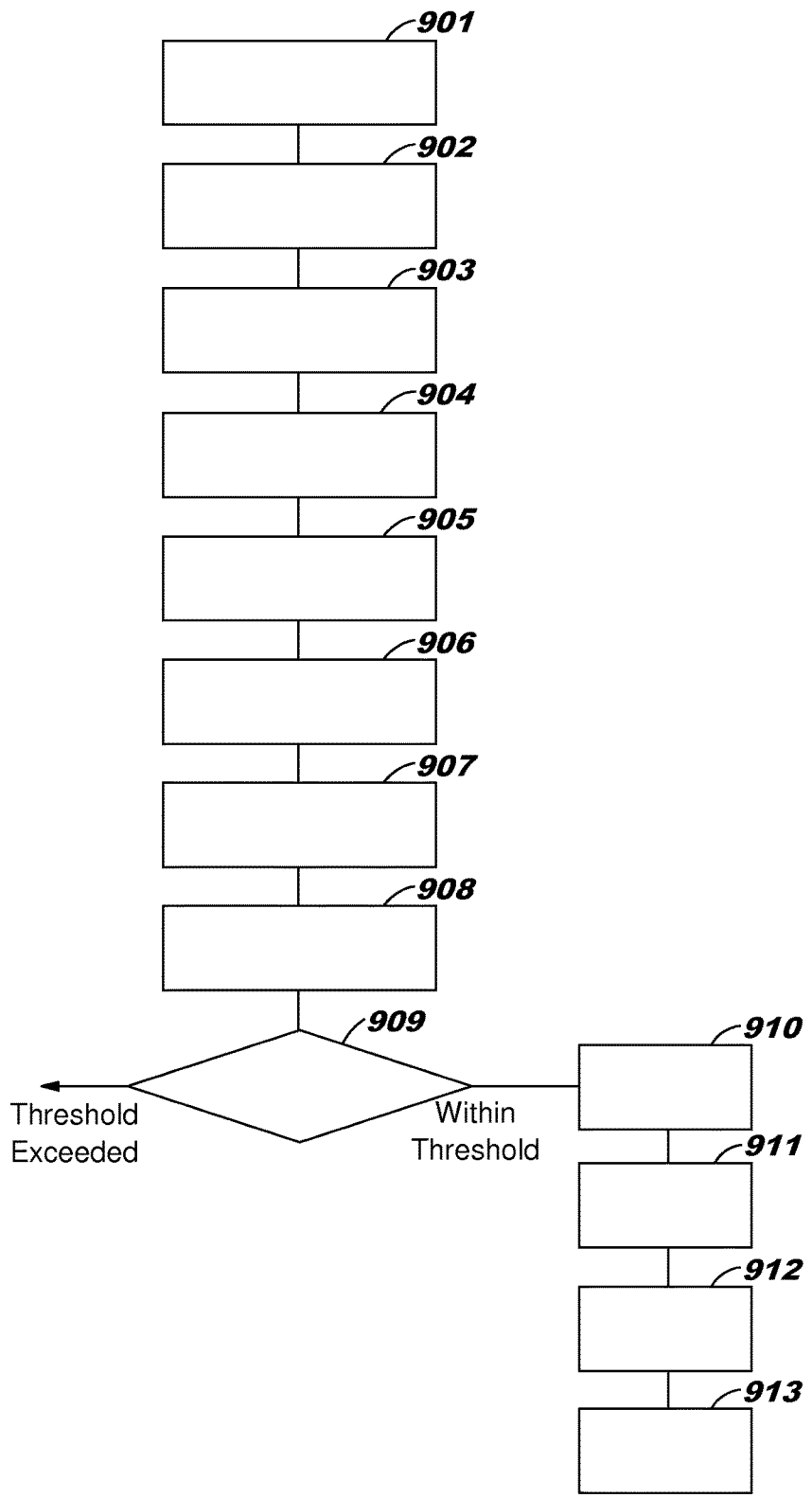
FIG. 9 shows an exemplary embodiment of the disclosed method.

FIG. 9 depicts another exemplary embodiment. Step 901 comprises selecting a first play design, said first play design having a first direction for a pass to be thrown. Step 902 comprises communicating the first play design to a user. Step 903 comprises communicating the first play design to the device. Step 904 comprises setting the timer 704 for a first time period. The first time period is defined as a duration that the device may actively detect lateral head position. Step 905 comprises establishing a first threshold range of allowable lateral head positions based on the first play design. Step 906 comprises starting the timer. Step 907 comprises monitoring lateral head position with the device. Step 908 comprises processing with the device in real-time, data associated with the monitored lateral head position. Step 909 comprises comparing the data associated with the monitored lateral head position with the first threshold range of allowable lateral head positions. Step 910 comprises failing to detect lateral head position outside the first threshold range of allowable lateral head positions. Step 911 comprises stopping detection of lateral head movement with the device concurrently with expiration of the first time period. Step 912 comprises recording data indicative of the failure to detect lateral head position outside the first threshold range of allowable lateral head positions in the memory storage unit 705. This exemplary embodiment may further comprise the step 913, which comprises communicating with the device, a message indicative that the first threshold range of allowable lateral head positions was not exceeded during the first time period.

Figure 10:
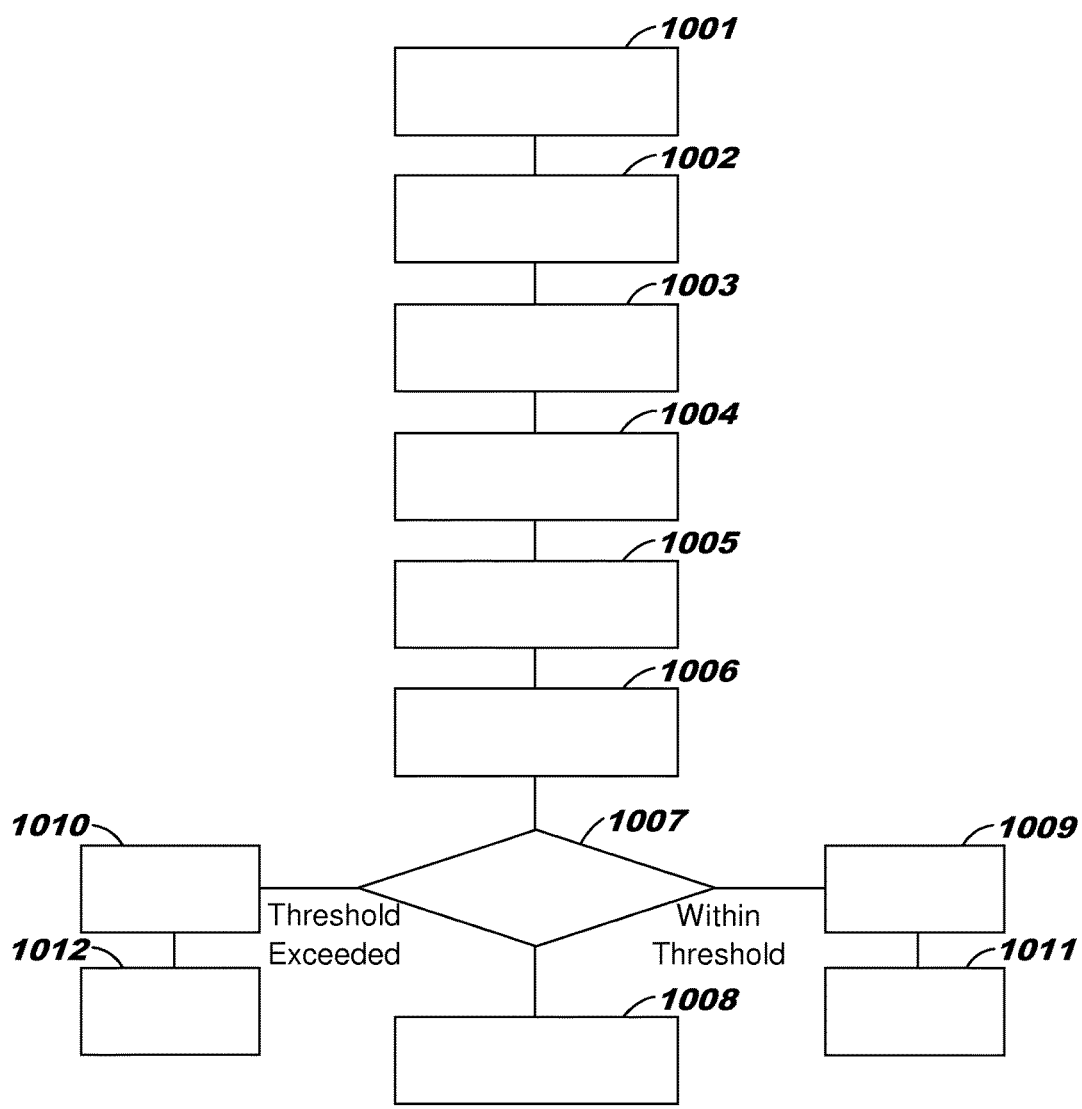
FIG. 10 shows an exemplary embodiment of the disclosed method.

The exemplary method shown in FIG. 10 comprises the step 1001 of selecting a first play design. The first play design has a first direction for a pass to be thrown. The method further comprises the step 1002 of communicating the first play design to a user. Step 1003 comprises communicating the first play design to the device. Step 1004 comprises establishing a first threshold range of allowable lateral head positions based on the first play design. Step 1005 comprises monitoring lateral head position with the device. Step 1006 comprises processing with the device in real-time, data associated with the monitored lateral head position. Step 1007 comprises comparing the data associated with the monitored lateral head position with the first threshold range of allowable lateral head positions. Step 1008 comprises recording data indicative of the result of the comparison of the data associated with the monitored lateral head position with the first threshold range of allowable lateral head positions in a memory storage unit 705. This data may be analyzed later with similar methods to those described above. The stored data may be extremely helpful, especially in cases where the disclosed methods are repeated during the training of a quarterback. This exemplary method may further comprise a step 1009 of failing to detect lateral head position outside the first threshold range of allowable lateral head positions. The method may further comprise the step 1011 of communicating with the device, a message indicative that the first threshold range of allowable lateral head positions was not exceeded. The method may further comprise the step 1010 of detecting a first lateral head position outside the first threshold range of allowable lateral head positions. It may also comprise the step 1012 of communicating with the device, a message indicative that the first threshold range of allowable lateral head positions was exceeded.

As described above, the device and methods disclosed herein have many different ways of being implemented. This is especially true with the myriad of possibilities for user interfaces. The following additional examples are provided as further sample implementations of the methods and devices disclosed herein, with a particular focus on exemplary user interface implementations.

FIG. 12 depicts an embodiment of the disclosed system comprising a device and a software system. The system is designed to be used by two people; one person who wears the device (athlete or quarterback), and one person who administers the device (administrator or coach). As previously described, the main purpose of the devices and methods disclosed herein, is to train the athlete to not fix his/her view in the direction that he/she intends to aim the ball. The diagrams in FIGS. 17A and 17B illustrate an embodiment of the disclosed device and show the process of setting exemplary parameters for the device and uses of the device. The parameters are set by an administrator/user choosing a particular play. The process of choosing a play may consist of a selecting or creating a quarterback, an offensive formation, the target receiver and a route. The administrator/user selects when to start the system (e.g. at the time of the snap). Once in use, the device alarm which may be a buzzer or vibration/electric stimulation felt or heard by the athlete, is automatically activated if the athlete breaches the set parameters. As shown in the embodiment of FIG. 17A, an administrator/user sets up the system 1701. One or more fields are created and calibrated 1703. One or more quarterbacks are created 1704. An administrator/user sets up the playbook 1702. One or more plays are created 1705. FIG. 17B shows an exemplary embodiment of how the plays may be applied. An athlete wears the device 1706. An administrator/user calls the play 1707 and selects field, quarterback, formation and play 1711. Following setup, an administrator/user starts the system 1708, which automatically puts the buzzer in "ready state". The buzzer is activated only if the athlete goes beyond the parameters set by the system 1709. The system automatically puts the buzzer in "not ready" state after 30 seconds 1710.

The diagrams in FIG. 20 display an exemplary disallowed zone. As described above, the buzzer or alarm will activate if the quarterback turns his/her head in that direction based on a particular receiver in a specific play. In this as well as other embodiments, the system sets the disallowed zone using data about a play, a receiver, and the receiver's route and distance. In the first display 2001 and the second display 2002, 0° is calibrated to point to goal post 1, and 180° is calibrated to point to goal post 2. If the user/administrator has selected the first goal post, the default disallowed zone is from 270° to 0° or from 0° to 90°, depending on the receiver's route. In the first display 2001, the target receiver indicated by the black diamond is supposed to end up in the right quadrant 2003, therefore the disallowed zone is from 0° to 90° right. In the second display 2002, the target receiver indicated by the black diamond is supposed to end up in the left quadrant 2004, therefore the disallowed zone is from 0° to 270° left.

As described above, exemplary user interfaces may include software systems built to be used on devices such as a tablet computer, desktop computer or mobile phone. FIG. 12A displays an exemplary embodiment of the software being used on a tablet computer. The display of FIG. 12A allows the user to choose between viewing the Playbook, quarterbacks, or Fields.

FIG. 12B shows an exemplary embodiment of the software being used to select, create, and calibrate a field. It shows the workflow for a user or administrator to create a field and calibrate the goal posts to 0° and 180°. The first display 1201 is a select a field screen showing a message indicating that a field has not been created yet. In this exemplary embodiment, to create a field, a user may take the following steps: Enter a field name as shown in the second screen 1202. Calibrate the field as shown in the third screen 1203 by setting Goal Post 1 as 0°. Goal Post 2 is automatically set as 180°. Continue calibration with the fourth screen 1204. When the goal post is lined up with the image on the screen 1204, the system automatically recognizes goal posts and sets at 0° as shown in the fifth screen 1205. The system automatically sets Goal 2 as 180° from Goal 1. Once a field is created, it may be selected from the modified Select field screen 1206. At any time the box 1208 may be clicked to return to the "Select a Field" screen 1201 and 1206. The "Create Field" button 1207 is disabled until all steps have been completed.

Figure 15A:
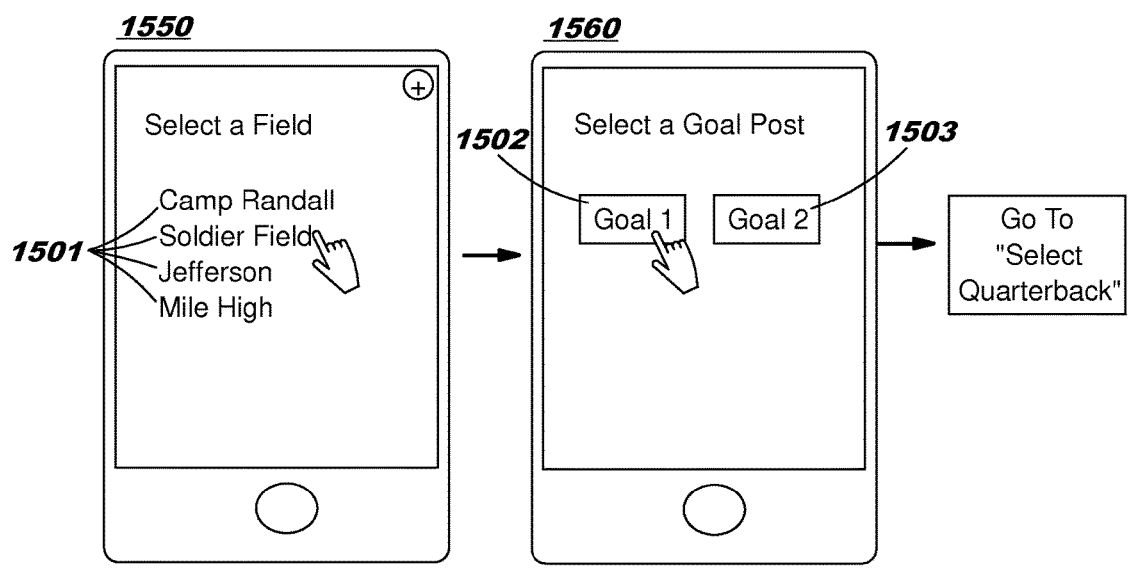
FIG. 15A shows an exemplary embodiment of a user interface to carry out the disclosed methods.

The diagrams of FIG. 15A illustrate two exemplary user interface displays 1550 and 1560, showing how an administrator/user may select a field from a list of fields 1501 that the administrator/user had previously created. In some embodiments, for example that which is shown in the first diagram 1550, the administrator/user can also select and delete a field by swiping on name and pressing the delete button that appears on the row. The administrator/user may also reorder fields by dragging a field name to a different row on the list. The second diagram 1560 shows an exemplary embodiment where the administrator/user may select either Goal Post 1 1502 or Goal Post 2 1503. If Goal Post 1 1502 is chosen, the system knows the default Disallowed Zone (as previously described as the zone exceeding the threshold) must be either from 270° to 0° or from 0° to 90°. If Goal Post 2 1503 is chosen, the system knows the default disallowed zone must be either from 90° to 180° or from 180° to 270°.

Figure 15B:
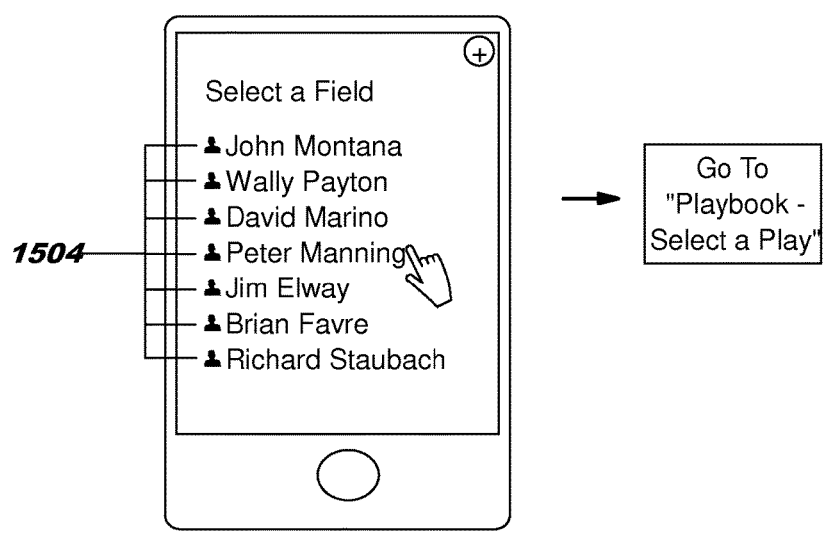
FIG. 15B shows an exemplary embodiment of a user interface to carry out the disclosed methods.

In exemplary embodiments of the user interface, once a field is selected, such as that shown in FIG. 15A, the administrator/user may move on to selecting a quarterback. FIG. 15B displays an exemplary embodiment of the disclosed device showing how an administrator/user may select a quarterback from the list of quarterbacks 1504 that an administrator/user had previously created. In some embodiments, the administrator/user can delete a quarterback by swiping on name and pressing the "delete" button that appears on the row. An administrator/user may also reorder quarterbacks by dragging a name to a different row.

Figure 16:
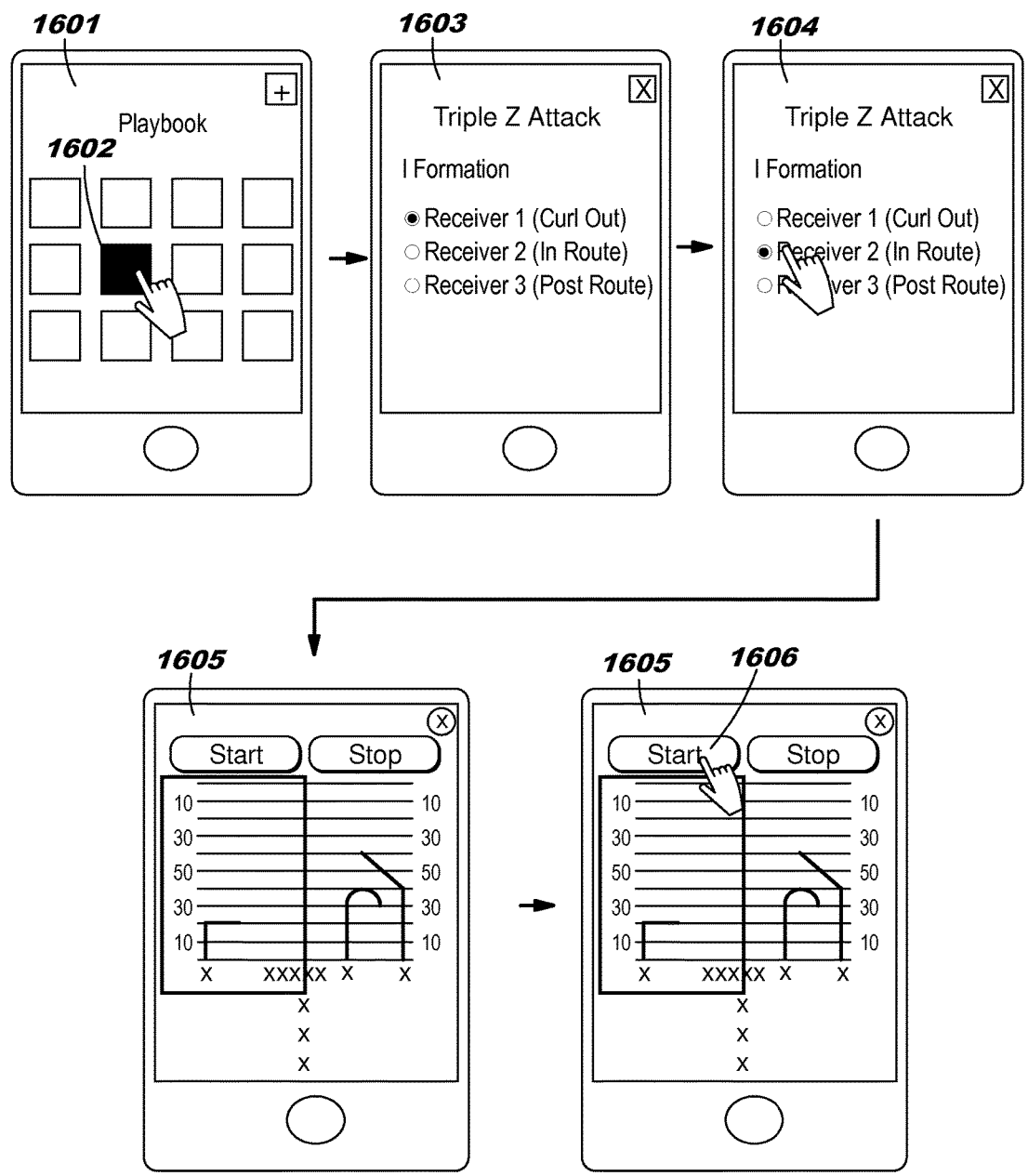
FIG. 16 shows an exemplary embodiment of a user interface to carry out the disclosed methods.

An example of how a play may be selected on a user interface is shown in FIG. 16. In the first step 1601, an administrator/user may select a play 1602 from a list that had been previously created. Further steps 1603 and 1604 allow the administrator/user to select a receiver and route combination within a selected play. The play is then shown on the display 1605. The administrator/user may select "Start" 1606 at the snap to put an alarm or buzzer in "ready" state. In some embodiments, the buzzer may automatically move into "not ready" state after 30 seconds, regardless of whether the buzzer has been activated or not.

Figure 18:
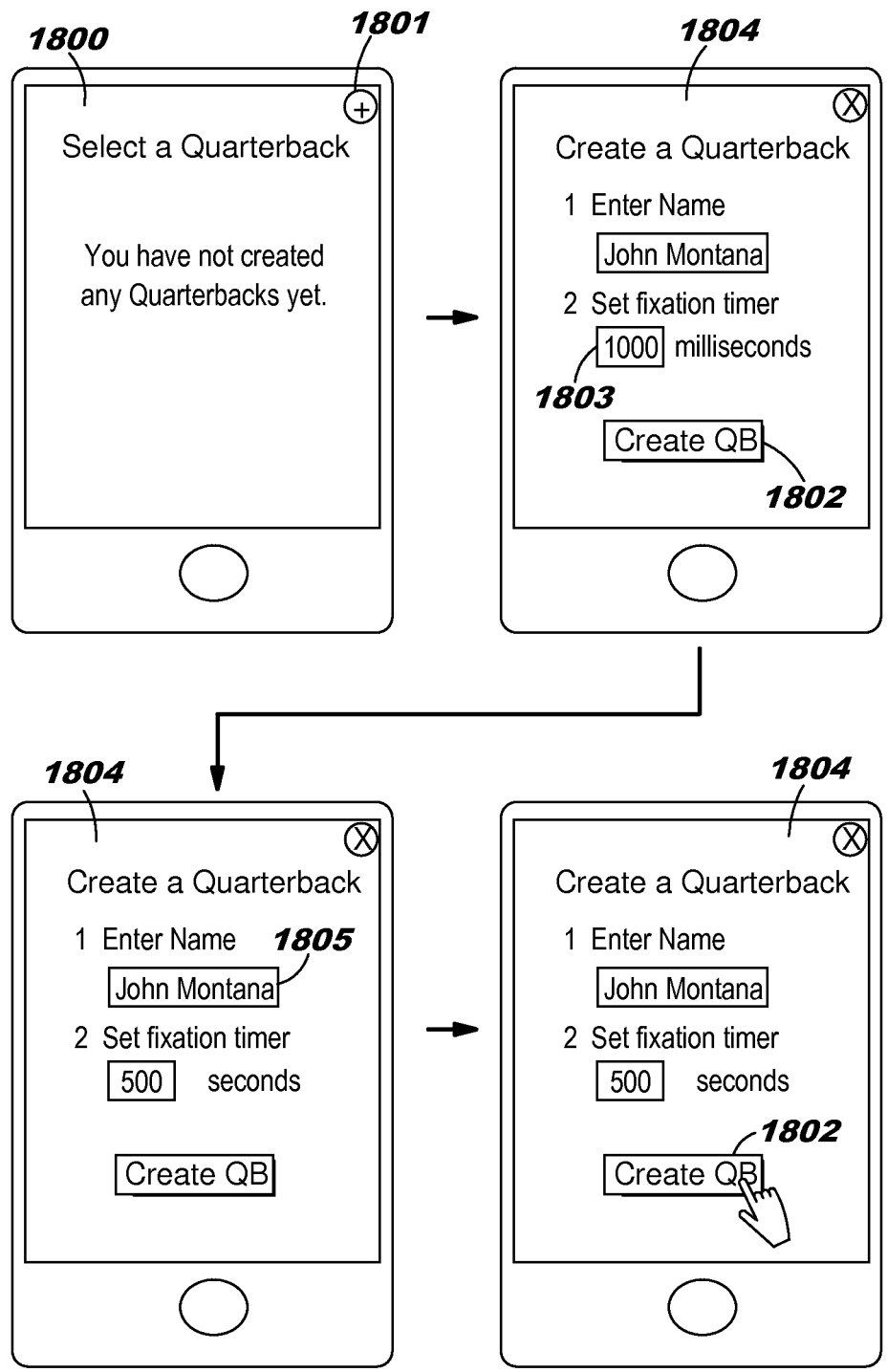
FIG. 18 shows an exemplary embodiment of a user interface to carry out the disclosed methods.

FIG. 18, illustrates and example of how a quarterback may be "created" with the user interface. In a first display 1800, an administrator/user can see that a quarterback cannot be selected because none have been added yet. In order to add a quarterback, administrator/user can click on the icon 1801. After clicking, a display 1804 appears allowing the administrator/user to name a quarterback, set the fixation timer for a set amount of time. The default time for the fixation time 1803 is 1000 milliseconds. The administrator/user may adjust that time as shown in the third display 1804. The "create QB" button 1802 is disabled until all information is filled. Once the administrator/user is comfortable with the inputs, the administrator/user can click the "create QB" button 1802 to create a quarterback and establish the quarterback's appropriate fixation timer.

Some embodiments of the disclosed device have a fixation timer. A fixation timer allows an athlete to look through the disallowed zone without the alarm or buzzer being activated as long as the athlete's head does not fixate in one angle for the length of the timer (default setting for timer is 1000 milliseconds). "Fixation" means the athlete is not moving his head left or right for the set amount of time. Stated differently, the quarterback can look through the disallowed zone without being alarmed or buzzed as long as the quarterback's head does not remain in the same angle from 0° or from 180° for the set amount of time on the fixation timer.

Figure 19A:
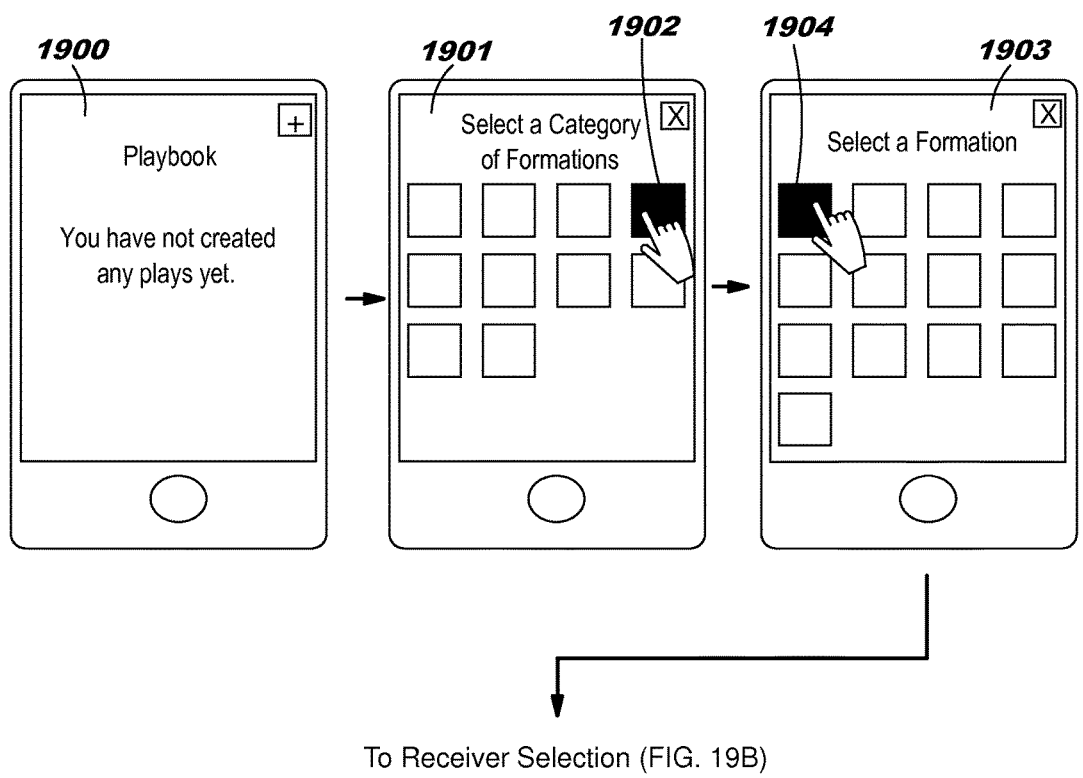
FIG. 19A shows an exemplary embodiment of a user interface to carry out the disclosed methods.
Figure 19C:
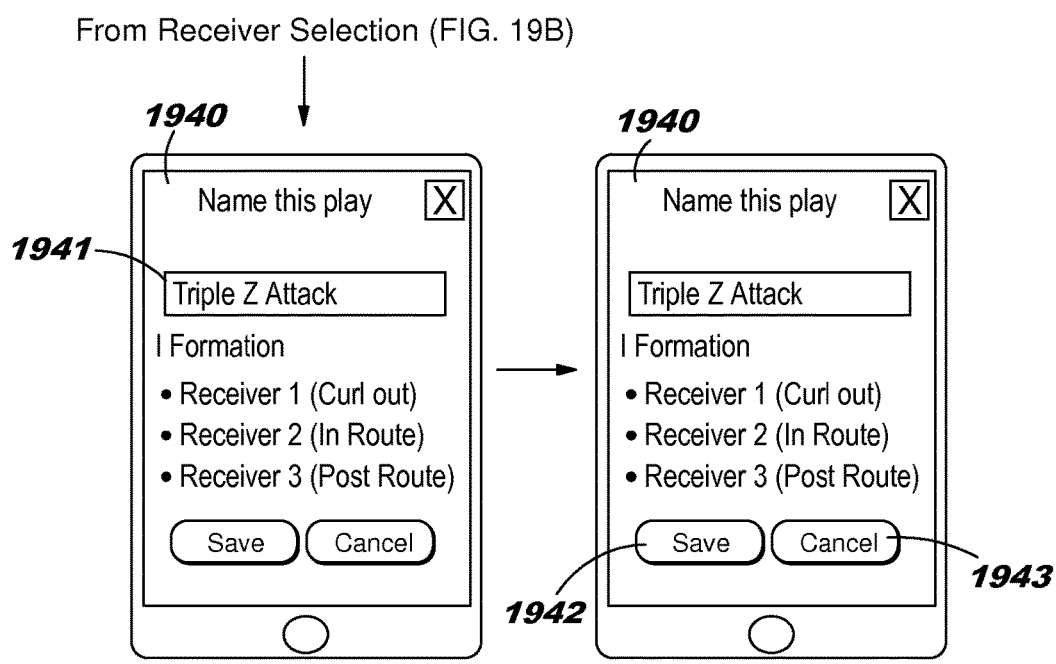
FIG. 19C shows an exemplary embodiment of a user interface to carry out the disclosed methods.

FIGS. 19A, 19B, and 19C show an exemplary embodiment of how to add plays to a playbook though an exemplary user interface. The playbook initially displayed 1900 contains zero plays. The user/administrator may create one or more plays to be saved in the playbook. The purpose of having a playbook is to have a selection of plays the user/administrator can choose from to set the parameters for the device that the athlete is wearing. The user/administrator can switch between plays in the Playbook in order to change the parameters for each play being carried out by an athlete.

In an exemplary embodiment of the user interface shown in FIG. 19A, a user/administrator may create a group of plays by selecting a category of formations 1902 from the preset menu display 1902. Then a specific formation 1904 is selected from the preset formation menu 1903.

FIG. 19B illustrates how receivers can be selected from the formation. A first receiver, indicated by the circled x is selected in the first display 1910. A preset route 1913 for the receiver to run is then selected from the next display 1911. Once a route 1913 is selected, the "Select Distance" box is activated. The user/administrator can then select a distance 1912 for the receiver's route 1913 as shown in the activated display 1911. After selecting a distance, a display 1915 appears to allow the user/administrator to add another receiver 1915. The previous steps can be repeated for second and third receivers running second routes 1923 and third routes 1933 over selected distances. At some point, the user/administrator may decide to select the "no" button 1916 in response to whether another receiver should be added. Some embodiments of the disclosed device may limit how many receivers may be used within a single play. For example, a maximum of five receivers may be used. As shown in FIG. 19C, the user/administrator can set up and name 1941 a play with the user interface display 1940. The user/administrator can either save 1942 or cancel 1943 the play. Examples of formations may include but not be limited to: 1 Formation (Slot 1, Offset 1, Power), pro set, Single Back, shotgun, wishbone, double wing, single wing, and triple formation. Similarly, examples of routes may include: Curl in/hook in, Curl out/Hook out, drag/in, corner/flag, fly, hatch, out, arrow, post, slant, wheel, dig, flat, swing, flare, double out, speed out, angle, and seal.

Figure 14:
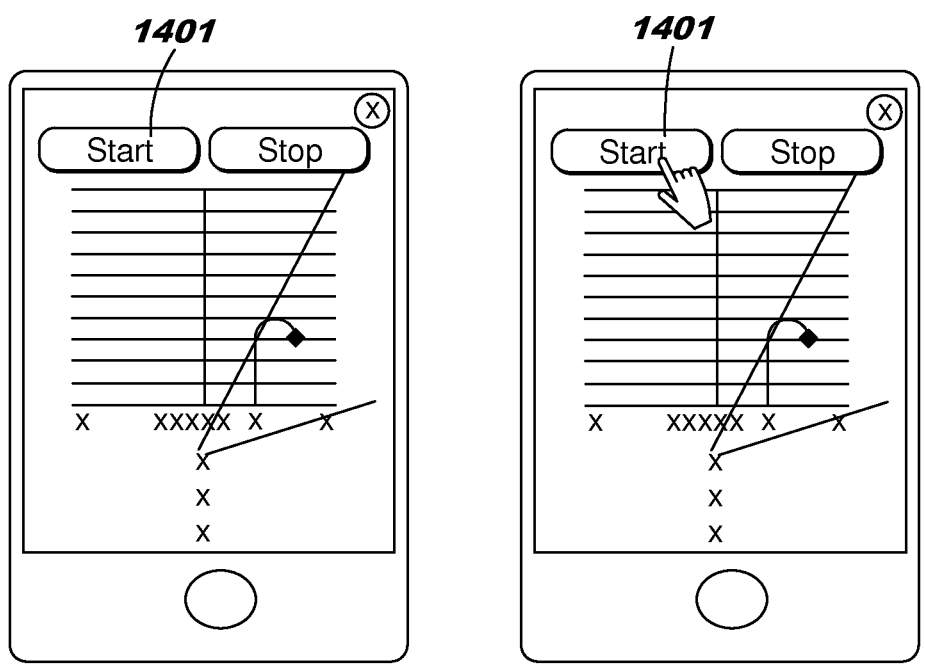
FIG. 14 shows an exemplary embodiment of a user interface to carry out the disclosed methods.

FIG. 14 shows an exemplary embodiment of a user interface which would allow an administrator/user to start the system by pressing the "start" button 1401. In an exemplary embodiment, the administrator/user would press the "start" button 1401 when the snap occurs during the play (i.e. when the quarterback is handed the ball). By selecting "start", in this exemplary embodiment, the administrator/user has set the buzzer to a "Ready" state for 30 seconds. After 30 seconds, the buzzer automatically leaves the ready state and enters a "not-ready" state. The "stop" button 1401 is only used if the administrator/user needs to interrupt a play or cancel a play before it starts. In an embodiment of the disclosed device, the buzzer can only be activated in the "Ready" state. The buzzer is automatically activated only if the athlete fixates his head within the Disallowed Zone for a time greater than the value of a fixation timer.

It should be appreciated that the methods and devices disclosed herein may benefit any athlete participating in a sport where the athlete is tasked with throwing, passing, or otherwise causing an object (such as a ball) to be projected toward a desired receiver.

Many athletes in sports other than football would also benefit from developing skills to avoid telegraphing passes to intended receivers to a defense. The device and methods disclosed herein would likely assist athletes in doing so.

While a number of exemplary aspects and embodiments have been discussed above, the alert reader will recognize certain modifications, permutations, additions and sub-combinations therefor. It is therefore intended that the following appended claims hereinafter introduced are interpreted to include all such modifications, permutations, additions, and sub-combinations are within their true spirit and scope.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the device and methods have been specifically disclosed by preferred embodiments and optional features, modification and variation of the concepts herein disclosed may be resorted to by those skilled in the art, and that such modifications and variations are considered to be within the scope as defined by the appended claims. Whenever a range is given in the specification, all intermediate ranges and sub-ranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the disclosure made herein.

I claim:

1. A method carried out with respect to a device for training a quarterback to develop counter-intuitive behavior in an effort to avoid telegraphing passes during a game of American football, the device comprising a sensor for detecting lateral head position and lateral head movement, the sensor mountable on a headgear and communicably coupled to a processor and software, for processing data associated with the lateral head position and data associated with lateral head movement, the processor and software communicably coupled to a user interface and memory, the method comprising the steps of:

creating a playbook in the memory of the device by means of the processor, the playbook comprising at least a first play design, the first play design having a first variable, the variable representing a first offensive formation indicating alignment of a quarterback and one or more offensive teammates, the first play design having a second variable, the second variable representing a first route of a target receiver;

accessing, through the user interface, the playbook stored in the memory of the device;

selecting, with the user interface, the first play design;

processing, with the device, data previously stored within the memory of the device related to the first and second variables of the first play design, including the first offensive formation and the first route of a target receiver to determine a first disallowed zone indicative of a directional area toward which the quarterback should not turn;

determining with the processor of the device a first calculated range of allowable lateral head positions based on the previously stored first and second variables of the first play design and corresponding to an area outside the first disallowed zone;

communicating the first play design to a user;

detecting with the device, a first lateral head position;

processing with the device, data associated with the first lateral head position and determining with the device that the first lateral head position is within the first calculated range of allowable lateral head positions based on the first play design;

detecting with the device, data indicating lateral head movement resulting in a second lateral head position;

processing with the device, data associated with the second lateral head position and determining that the second lateral head position is beyond the first calculated range of allowable lateral head positions based on the first play design; and communicating with the device, a message indicative that the lateral head position is beyond the range of allowable lateral head positions based on the first play design.

2. The method of claim 1, further comprising the steps of:
viewing a graphical representation of the first disallowed zone with the user interface; and
modifying the size of the graphical representation of the first disallowed zone with the user interface;
wherein the modification to the size of the graphical representation of the first disallowed zone causes a change in a level of difficulty for the quarterback to maintain lateral head positions within the range of allowable lateral head positions.

3. The method of claim 1, further comprising the step of selecting with the user interface, one or more desired levels of difficulty, and wherein the first calculated range of allowable lateral head positions is also based on the selected level of difficulty.

4. The method of claim 1 further comprising the step of storing in a memory storage device, the data associated with the first lateral head position, the data associated with the second lateral head position, and data indicating that the first range of allowable lateral head positions was exceeded.

5. The method of claim 1
wherein the playbook comprises a second play design, the second play design having a third variable, the third variable representing a second offensive formation indicating alignment of a quarterback and one or more offensive teammates, the second play design having a fourth variable, the fourth variable representing a second route of a target receiver, and further comprising the steps of:

accessing, through the user interface, the playbook stored in the memory of the device;
selecting, with the user interface, the second play design;
processing, with the device, data previously stored within the memory of the device related to the third and fourth variables of the second play design, including the second offensive formation and the second route of a target receiver to determine a second disallowed zone indicative of a directional area toward which the quarterback should not turn;
determining with the processor of the device, a calculated second range of allowable lateral head positions based on the previously stored third and fourth variables of the second play design and corresponding to an area outside the second disallowed zone;
communicating the second play design to the user;
detecting with the device, a third lateral head position;
processing with the device, data associated with the third lateral head position and
determining with the device that the third lateral head position is within the range of allowable head positions based on the second play design;
detecting with the device, data indicating lateral head movement resulting in a fourth lateral head position;
processing with the device, data associated with the fourth lateral head position and determining that the fourth lateral head position is beyond the range of allowable lateral head positions based on the second play design; and
communicating with the device, a message indicative that the lateral head position is beyond the range of allowable lateral head positions based on the second play design.

6. The method of claim 1, wherein the device further comprises a timer, and the method further comprises the steps of:
setting the timer for a first time period, the first time period defined as a duration that the device will actively detect lateral head position;
starting the timer for the first time period; and
stopping the timer concurrently with when the first calculated range of allowable lateral head positions based on the first play design is exceeded.

7. The method of claim 5, wherein the first play design and the second play design are the same.

8. The method of claim 6 wherein the playbook comprises a second play design, the second play design having a third variable, the third variable representing a second offensive formation indicating alignment of a quarterback and one or more offensive teammates, the second play design having a fourth variable, the fourth variable representing a second route of a target receiver, and further comprising the steps of:
accessing, through the user interface, the playbook stored in the memory of the device;
selecting, with the user interface, the second play design;

processing, with the device, data previously stored within the memory of the device related to the third and fourth variables of the second play design, including the second offensive formation and the second route of a target receiver to determine a second disallowed zone indicative of a directional area toward which the quarterback should not turn;

setting the timer for a subsequent time period, the subsequent time period defined as a length of time that the device will actively detect lateral head position;

determining with the processor of the device, a calculated second range of allowable lateral head positions based on the previously stored third and fourth variables of the second play design and corresponding to an area outside the second disallowed zone;

communicating the second play design to a user:

starting the timer;

detecting with the device, a third lateral head position;

processing with the device, data associated with the third lateral head position and determining with the device that the third lateral head position is within the second range of allowable lateral head positions based on the second play design;

detecting with the device, a fourth lateral head position;

processing with the device, data associated with the fourth lateral head position and determining with the device that the fourth lateral head position is within the second range of allowable lateral head positions based on the second play design;

stopping detection of lateral head movement with the device concurrently with expiration of the subsequent time period; and communicating with the device, a message indicative that the second range of allowable lateral head positions based on the second play design was not exceeded during the subsequent time period.

9. The method of claim 1, wherein the device comprises a communication means capable of communicating messages to a quarterback and wherein the message indicative that the lateral head position is beyond the range of allowable lateral head positions, based on the first play design, is communicated to the quarterback.

10. The method of claim 1, wherein the device comprises a communication means capable of communicating messages to a quarterback and wherein the first play design is communicated through the communication means of the device to the quarterback.

11. The method of claim 1, wherein the user interface comprises a hand-held computer, smartphone, or tablet.

12. The method of claim 9, wherein the communication means capable of communicating messages to the quarterback comprises an audible alarm, a flashing light, a vibration, a shock or a static light.

13. A method carried out with respect to a device for training a quarterback to develop counter-intuitive behavior in an effort to avoid telegraphing passes during a game of American football, the device comprising a sensor for detecting lateral head position and lateral head movement, the sensor mountable on headgear and communicably coupled to a processor and software for processing data associated with the lateral head position and data associated with lateral head movement, the processor and software communicably coupled to a user interface and memory, the method comprising the steps of:

creating a playbook in the memory of the device by means of the processor, the playbook comprising at least a first play design, the first play design having a first variable, the first variable representing a first offensive formation indicating alignment of a quarterback and one or more offensive teammates, the first play design having a second variable, the second variable representing a first route of a target receiver, accessing, through the user interface, the playbook stored in the memory of the device;

selecting, with the user interface, the first play design;

processing, with the device, data previously stored within the memory of the device related to the first and second variables of the first play design, including the first offensive formation and the first route of a target receiver to determine a first disallowed zone indicative of a directional area toward which the quarterback should not turn;

determining with the processor of the device a first calculated range of allowable lateral head positions based on the previously stored first and second variables of the first play design and corresponding to an area beyond the first disallowed zone;

communicating the first play design to a user;

monitoring lateral head position with the device;

processing with the device, data associated with the monitored lateral head position;

comparing, with the processor of the device, the data associated with the monitored lateral head position with the first calculated range of allowable lateral head positions based on the first play design; and recording in a memory storage unit, data indicative of a result of the comparison of the data associated with the monitored lateral head position with the first calculated range of allowable lateral head positions based on the first play design.

14. The method of claim 13 further comprising the step of:

failing to detect, with the device, lateral head position beyond the first calculated range of allowable lateral head positions based on the first play design; and communicating, with the device, a message indicative that the monitored lateral head positions were not beyond the first calculated range of allowable lateral head positions based on the first play design.

15. The method of claim 13 further comprising the step of:

detecting, with the device, a first lateral head position beyond the first calculated range of allowable lateral head positions based on the first play design;

communicating with the device, a message indicative that the first calculated range of allowable lateral head positions based on the first play design was exceeded.

16. The method of claim 13 wherein the device further comprises a timer communicably coupled to the processor and the method further comprises the steps of:

setting the timer for a first time period, the first time period defined as a duration that the device will actively detect lateral head position;

starting the timer;

failing to detect lateral head position beyond the first calculated range of allowable lateral head positions based on the first play design; and stopping detection of lateral head movement with the device concurrently with expiration of the first time period; and wherein the data indicative of the result of the comparison of the data associated with the monitored lateral head position with the first calculated range of allowable lateral head positions comprises data indicative of the failure to detect lateral head position beyond the first calculated range of allowable lateral head positions.

17. The method of claim 13 wherein the step of monitoring lateral head position with the device includes detecting with the device, a first lateral head position,
wherein the step of processing with the device, data associated with the monitored lateral head position, includes processing with the device, data associated with the first lateral head position, and
wherein the step of comparing, with the processor of the device, the data associated with the monitored lateral head position with the first calculated range of allowable lateral head positions based on the first play design includes comparing the first lateral head position to the first calculated range of allowable lateral head positions,
and wherein recording data indicative of the result of the comparison of the data associated with the monitored lateral head position with the first calculated range of allowable lateral head positions based on the first play design in a memory storage unit includes recording a result of the comparison of the first lateral head position to the first the calculated range of allowable lateral head positions based on the first play design in the memory storage unit;
and further comprising the step of:
detecting with the device, a subsequent lateral head position;
processing with the device, data associated with the subsequent lateral head position;
comparing the subsequent lateral head position to the first calculated range of allowable lateral head positions based on the first play design, and recording a subsequent result in the memory storage unit;
stopping detection of lateral head movement; and
communicating with the device, recorded data indicative of whether the first calculated range of allowable lateral head positions is exceeded.

18. The method of claim 17 further comprising the step of manipulating the recorded data for statistical analysis purposes.

19. The method of claim 15 wherein the device comprises a communication means capable of communicating messages to a quarterback, and wherein the message indicative that the first calculated range of allowable lateral head positions based on the first play design was exceeded is communicated to the quarterback.

20. A method carried out with respect to a device for training a quarterback in the game of American football, the device comprising a sensor for detecting lateral head position and lateral head movement, the sensor mountable on a headgear and communicably coupled to a processor and software, for processing data associated with the lateral head position and data associated with lateral head movement, the processor and software communicably coupled to a user interface and memory, the method comprising the steps of:
utilizing the user interface to select a first play design from a playbook previously stored in the memory of the device, the playbook comprising multiple play designs, the first play design having a first variable, the first variable representing a first offensive formation, the first play design having a second variable, the second variable representing a first route of a target receiver;
setting, by the device, a first disallowed zone indicative of a directional area that a quarterback should not turn, the first disallowed zone based on the first and second variables related to the first play design, including the first offensive formation and the first route of a target receiver;
determining with the processor of the device a first calculated range of allowable lateral head positions based on the previously stored first and second variables of the first play design and corresponding to an area outside the first disallowed zone;
communicating the first play design to a user;
detecting with the device, a first lateral head position;
processing with the device, data associated with the first lateral head position and determining with the device that the first lateral head position is within the first calculated range of allowable lateral head positions based on the previously stored first and second variables of the first play design;
detecting with the device, data indicating lateral head movement resulting in a second lateral head position;
processing with the device, data associated with the second lateral head position and determining that the second lateral head position is beyond the range of allowable lateral head positions based on the previously stored first and second variables of the first play design; and
communicating with the device, a message indicative that the lateral head position is beyond the range of allowable lateral head positions based on the first play design.

21. The method of claim 13, wherein the device comprises a fixation timer, the method further comprising the steps of:
detecting, with the device, a first lateral head position beyond the first calculated range of allowable lateral head positions based on the first play design;
activating the fixation timer to begin a countdown representing a first amount of time the quarterback is able to be turned towards the directional area of the disallowed zone without triggering the device to communicate a message indicative that the first lateral head position is beyond the calculated range of allowable lateral head positions based on the first play design.

22. The method of claim 21 further comprising the steps of:
determining, with the device, prior to an expiration of the countdown of the fixation timer, that the monitored lateral head position is within the calculated range of allowable lateral head positions; and
communicating, with the device, a message indicative that the lateral head position was not beyond the range of allowable lateral head positions based on the first play design.

23. The method of claim 1 wherein the first variable is selected from a list of formations previously stored in the memory of the device and accessed through the user interface of the device.

24. The method of claim 1 wherein the second variable is selected from a list of routes of a target receiver previously stored in the memory of the device and accessed through the user interface of the device.

25. The method of claim 20 further comprising the steps of:
utilizing the user interface to select a subsequent plurality of plays from the playbook previously stored in the memory of the device, each of the plurality of plays having a first subsequent variable, the first subsequent variable representing a subsequent first offensive formation and a second subsequent variable, the second subsequent variable representing a subsequent first route of a target receiver;
setting, by the device, subsequent disallowed zones indicative of directional areas that a quarterback should not turn, the subsequent disallowed zones based on at least the first and second subsequent variables related to the subsequent play designs, including the subsequent first offensive formation and the subsequent first route of a target receiver;

determining with the processor of the device a calculated range of allowable lateral head positions based on the previously stored first and second subsequent variables for each of the subsequent plurality of plays from the playbook and corresponding to an area outside the disallowed zones of the subsequent play designs;

communicating the subsequent play designs to a user;

detecting with the device, a third lateral head position;

processing with the device, data associated with the third lateral head position and determining with the device that the third lateral head position is within the range of allowable lateral head positions based on a first subsequent play design;

detecting with the device, data indicating lateral head movement resulting in a fourth lateral head position;

processing with the device, data associated with the fourth lateral head position and determining that the fourth lateral head position is beyond the range of allowable lateral head positions based on a second subsequent play design; and communicating with the device, a message indicative that the fourth lateral head position is beyond the range of allowable lateral head positions based on the second subsequent play design.

26. The method of claim 1 where the playbook comprises additional play designs which may be selected with the user interface and processed with the device.

27. The method of claim 16, wherein the first time period is less than about three seconds.

28. The method of claim 16, wherein the timer is started concurrently with a football being snapped to the quarterback.

29. The method of claim 16, wherein the step of starting the timer is completed by a coach through the user interface.

30. The method of claim 1 further comprising the step of providing, with the user interface of the device, a representation of the determined disallowed zone as an area indicated on a graphical representation of a football field displayed on the user interface of the device.

\* \* \* \* \*